(12) United States Patent
Pappas et al.

(10) Patent No.: US 9,436,933 B2
(45) Date of Patent: Sep. 6, 2016

(54) WIRELESS TIME ATTENDANCE SYSTEM AND METHOD

(71) Applicant: Exaktime Innovations, Inc., Calabasas, CA (US)

(72) Inventors: Anthony H. Pappas, Corvallis, OR (US); John K. O'Hara, Moorpark, CA (US); Casey P. Powers, Agoura Hills, CA (US); Eric R. Renken, Niles, MI (US); Scott K. Prewett, Encino, CA (US); Myles Christensen, Orem, UT (US); Matthew K. Dunham, Eagan, MN (US); Christopher M. Anderson, Minneapolis, MN (US); Dustin L. Morris, Minneapolis, MN (US)

(73) Assignee: Exaktime Innovations, Inc., Calabasas, CA (US)

( * ) Notice: Subject to any disclaimer, the term of this patent is extended or adjusted under 35 U.S.C. 154(b) by 157 days.

(21) Appl. No.: 14/163,276

(22) Filed: Jan. 24, 2014

(65) Prior Publication Data
US 2014/0207635 A1    Jul. 24, 2014

Related U.S. Application Data

(60) Provisional application No. 61/756,268, filed on Jan. 24, 2013.

(51) Int. Cl.
*G06F 15/02* (2006.01)
*G06Q 10/10* (2012.01)
*G07C 1/00* (2006.01)
*G06Q 40/00* (2012.01)

(52) U.S. Cl.
CPC .............. *G06Q 10/109* (2013.01); *G07C 1/00* (2013.01); *G06Q 40/10* (2013.01)

(58) Field of Classification Search
CPC ...................................................... G06Q 40/10
USPC ........................................................... 705/32
See application file for complete search history.

(56) References Cited

U.S. PATENT DOCUMENTS

| | | | |
|---|---|---|---|
| 5,459,657 A | 10/1995 | Wynn et al. | |
| 5,842,181 A | 11/1998 | Fanjoy | |
| 7,099,236 B2 | 8/2006 | Yamagishi | |
| 7,114,648 B2 | 10/2006 | Ginskey et al. | |
| 7,298,673 B2 | 11/2007 | Pappas et al. | |
| 7,489,595 B2 | 2/2009 | King et al. | |
| 8,209,243 B2 | 6/2012 | Smith et al. | |
| 8,290,479 B2 | 10/2012 | Aaron et al. | |
| 2002/0175211 A1 | 11/2002 | Dominquez et al. | |
| 2006/0146649 A1* | 7/2006 | Pappas ............... | G07C 1/10 368/10 |

(Continued)

*Primary Examiner* — Hunter Wilder
(74) *Attorney, Agent, or Firm* — Kelly & Kelley, LLP

(57) ABSTRACT

A system and method for tracking and communicating time and attendance data for workers at a remote worksite is disclosed. A portable time and attendance device is configured to receive and store worker time attendance data and transmit the data to a remote computer via a wireless network, such as a wireless cellular communications network. In order to conserve battery power, a main unit of the device periodically queries an electronic time and attendance clock of the device according to a pre-established schedule to determine if new worker time and attendance data has been received. If so, according to the pre-established schedule, the new worker time and attendance data is transmitted to the remote computer via the wireless network. Otherwise, certain functions and components of the device remain in a low battery usage sleep mode.

18 Claims, 47 Drawing Sheets

(56) References Cited

U.S. PATENT DOCUMENTS

| | | |
|---|---|---|
| 2007/0063014 A1 | 3/2007 | Plumb et al. |
| 2008/0114683 A1 | 5/2008 | Neveu et al. |
| 2008/0172311 A1 | 7/2008 | Curran |
| 2009/0127328 A1 | 5/2009 | Aissa |
| 2009/0248553 A1* | 10/2009 | Taylor ................ G06Q 10/1091 705/32 |
| 2010/0161462 A1 | 6/2010 | Pappas et al. |
| 2011/0119080 A1* | 5/2011 | Hayter ............... A61B 5/14532 705/2 |
| 2012/0095857 A1* | 4/2012 | McKelvey ........... G06Q 20/204 705/17 |
| 2013/0268418 A1 | 10/2013 | Sardi et al. |
| 2014/0136651 A1* | 5/2014 | Hodges .................. G06F 8/665 709/217 |

\* cited by examiner

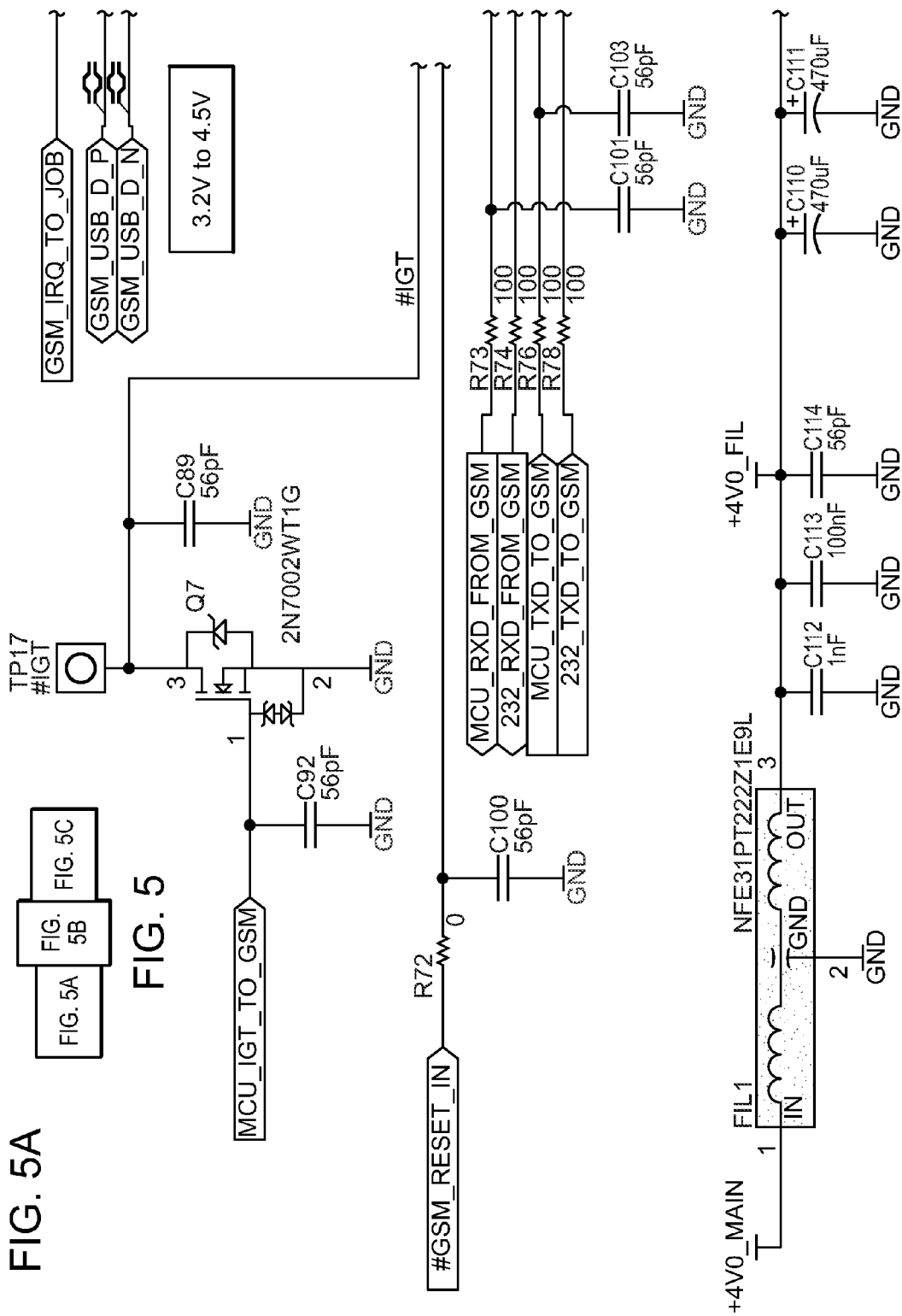

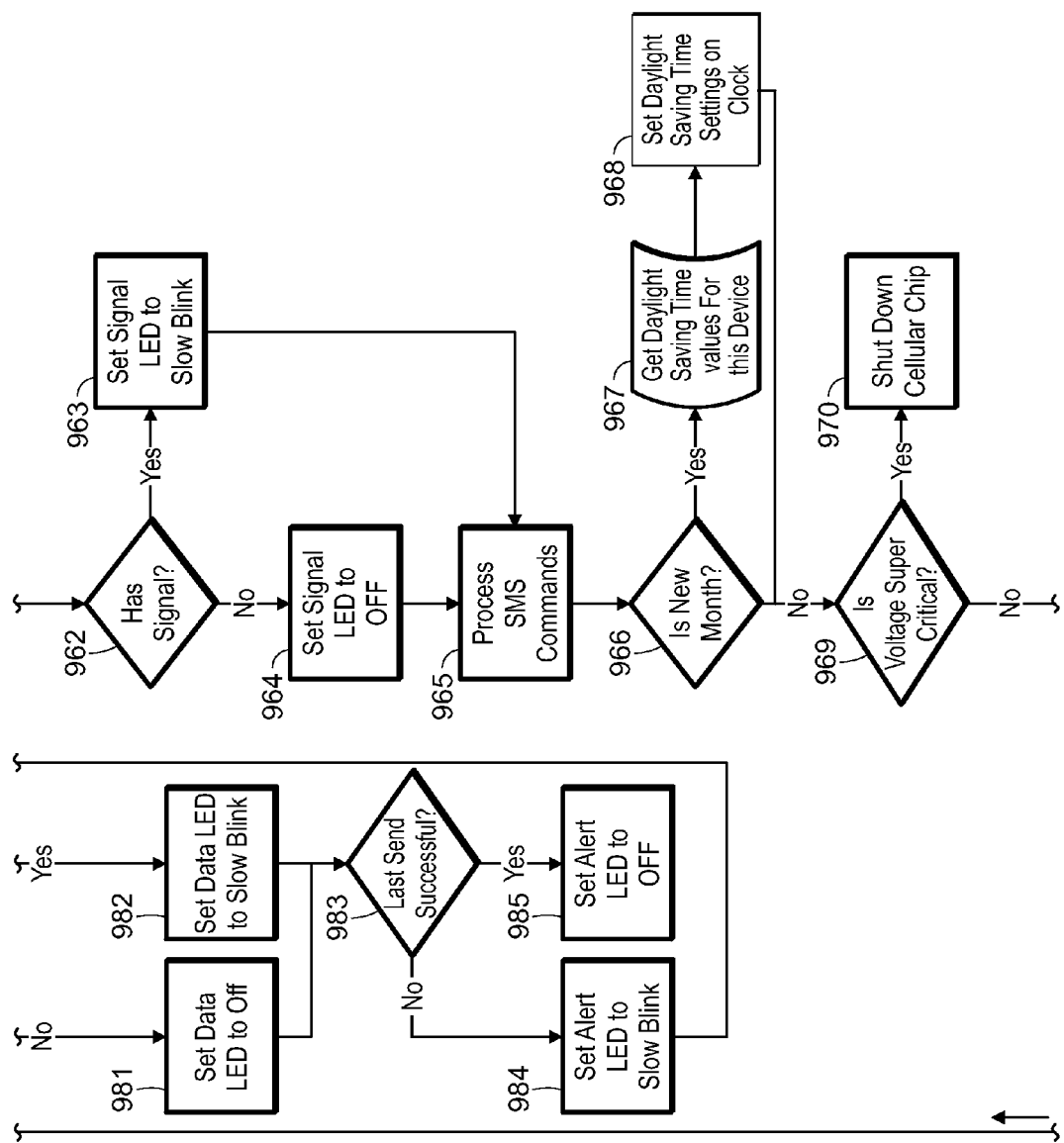

WIRELESS TIME ATTENDANCE SYSTEM AND METHOD

BACKGROUND OF THE INVENTION

The present invention generally relates to time clocks and timekeeping apparatuses. More particularly, the present invention relates to a timekeeping system specifically designed for monitoring employee time and automatically and wirelessly sending employee time data to a remote location.

It is common practice for employees to "clock in" and "clock out" when checking in and out of work, such as when arriving at work, taking a lunch break and leaving for the day. The use of time clocks for tracking employee attendance and duties is commonplace.

In some cases, a punch card or the like is used wherein the employee inserts a card or paper into the machine, which provides a date and time stamp. This occurs over the course of a day, week, several weeks, etc. constituting the shift or work period for the employee. The supervisor or individual in charge of payroll must physically collect the time cards at the end of the shift or work period and calculate the hours worked each day for each employee. This is a time-consuming and expensive task.

More recently, advanced versions of time clocks are electronic or digital in nature and the employee clocks in and clocks out by means of a code inputted into the device either manually or by means of a swipe card or the like. Time and attendance records can be electronically pulled from the timekeeping apparatus in a variety of ways. In one way, the timekeeping apparatus is networked to a computer which has the necessary timekeeping management software. This is often the case, for example, when the one or more time clocks are within the same building and electronically wired and connected to the building manager's computer.

However, there are many instances where such an arrangement is simply not feasible. For example, the building might not be wired for network access between different offices or locations. In yet other instances, employees work at multiple buildings or job sites. In fact, in some industries, such as the construction industry, employees and workers might work at different locations throughout a given time period. The construction industry also presents additional challenges in that the time attendance clock must be suited for outdoor use.

Applicant, Exaktime, Inc., currently offers a time attendance clock sold under the name JobClock™ which is the subject of U.S. Pat. No. 7,298,673 B2, which automates timekeeping procedures while being specifically designed for outdoor use, such as at job construction sites and the like. In accordance with this time attendance system, a touch button, also referred to as a KeyTab™, manually held by the employee is touched to a portion of the time attendance clock to clock in or clock out. Periodically, a payroll manager or supervisor collects the electronic time attendance records by visiting each time clock at each jobsite and downloading the time attendance records. This is typically done every week or two and by means of a hand-held device which is capable of electronically communicating with the time attendance clock by infrared or Bluetooth.

While overcoming many disadvantages of the manual time tracking procedures and being much more durable than traditional time clock apparatuses, this device and system also presents several drawbacks. Exaktime's jobClock™ apparatus and system still requires the need to manually collect the data by requiring direct user action to collect the data. This often means a collection device is needed, such as an infrared or RF device or a computer. Collection must be performed in a specific window of time, and certainly after the desired time attendance records have been captured. A person is required to perform the collection, which must either be done at the physical location where the clock is located or the clock must be brought into the office or other collection point, making it temporarily unavailable for site usage. Of course, this causes the business to incur transportation and labor costs so that the clock can be used.

In some cases, the worker forgets to clock in when they arrive at the start of their shift or clock out, such as at the beginning of a lunch break or at the end of their shift. These missing time attendance time punches have proven difficult to deal with, particularly when the time attendance records are not collected for several days or weeks later and the missing time punches are found. Also, in the case of remote jobsites, management is not aware of who was tardy, on time, early, missing from the jobsite, etc. until several days or weeks after the fact when the data is collected and processed.

In certain industries, such as the construction industry, it is common for jobsites to initially not have AC power from the power grid, at least during the initial phases of construction, including when surveying the land, grading the land, pouring foundations, and even the initial framing of the building. During these phases, electrical power from the local municipality or power grid may not be available to all locations within the worksite, and in some cases not available to the worksite whatsoever. Some construction projects can be quite remote from the general contractor's or construction company's headquarters, and thus physically collecting the time and attendance data from the workers at the worksite is inconvenient and difficult. There are instances where a worksite may not have access to alternating current electrical power for several weeks or months, or a supervisor or the like may not be available to collect the records from the timekeeping apparatus for several weeks at a time.

Accordingly, there is a continuing need for a system for tracking and communicating time attendance data for workers at a remote worksite. Such a system should include a portable time and attendance device which is capable of both being battery powered as well as powered by alternating current. Such a portable time attendance device should be configured to receive and store worker time attendance data and transmit the data to a remote computer via a wireless network. Such a system and device should be designed and configured so as to conserve battery power to enable the device to operate for a prolonged period of time without the need to recharge or replace the batteries or supply power from the power grid. The present invention fulfills these needs and provides other related advantages.

SUMMARY OF THE INVENTION

The present invention resides in a system, and related method, for tracking and communicating time and attendance data for workers at a remote worksite. The system of the present invention can operate without power from a power grid for several weeks or months at a time, while still automatically and regularly receiving and storing and transmitting worker time and attendance data.

The system generally comprises a portable time and attendance device which is configured to receive and store worker time attendance data and transmit the data to a remote computer via a wireless network. The portable time and attendance device comprises a main unit having a power module including a battery, an electronic controller, an electronic memory and a communications module for transmitting and receiving data via the wireless network. Typically, the power module of the portable time and attendance device comprises an adapter for receiving alternating current power, in addition to the battery power. In one embodiment, the communications module is configured to receive and transmit data via a wireless cellular communications network.

An electronic time clock, associated with a portable housing containing the main unit, is in electronic communication with the main unit and comprises a user interface for entering worker time attendance data. The electronic time clock also includes an internal clock, a memory for storing the entered worker time attendance data, and a second battery for powering the electronic time clock at least when the electronic time clock does not receive power from the main unit battery.

The main unit is configured to periodically request recorded time and attendance data from the time and attendance clock according to a preset schedule. The recorded time and attendance data is forwarded to the remote computer via the wireless cellular communications network if there is new time and attendance data since the prior transmission.

The time and attendance device may include a GPS module for determining the location of the time and attendance device.

The portable time and attendance device may also include a status notification interface. Typically, this comprises a plurality of LEDs which are illuminated in combination and/or flash to alert a user of the status of the device.

In accordance with the invention, time and attendance data for a worker is received on the electronic time clock. The time and attendance data for the worker is stored on the electronic memory of the electronic time and attendance clock. Typically, a worker identity and a time that the worker clocked in or clocked out is associated with the time and attendance data stored in the time and attendance clock electronic memory.

Periodically, the main unit queries the electronic time and attendance clock according to a pre-established schedule to determine if new worker time and attendance data has been stored on the electronic memory of the electronic time and attendance clock. If there is new worker time and attendance data since a prior transmission, the new worker time and attendance data is transmitted to a remote computer via the wireless network. New worker time and attendance data from the electronic memory of the time and attendance clock is retrieved and stored on the main unit prior to transmitting the new worker time and attendance data to the remote computer.

Status data of the time and attendance device may be transmitted when transmitting the time and attendance data. This can include device power data. This can also include transmitting device GPS data with the time and attendance data.

A text message may be transmitted when the time and attendance data is transmitted to the remote computer. For example, the text message may comprise a Twitter™ notification Tweet™, notifying the recipient that data was transmitted and received.

At least the communications module of the main unit enters a sleep mode between scheduled query and transmission times.

Typically, the time and attendance clock uses the main unit power supply as a primary source of power. However, the time and attendance clock will use power from the second battery of the time and attendance clock as a backup power supply when power from the main unit power supply is not available.

Device status notifications may be conveyed to a user via a predetermined pattern of illumination of a plurality of LEDs, such as when a clock-in or clock-out event occurs, when records are being transmitted, or as an indication of battery supply.

The receiving and storing of the time and attendance data of a worker on the electronic time and attendance clock and the transmitting of time and attendance data from the main unit can occur asynchronously.

The device may receive text messages, such as from a Short Message Service (SMS) from a remote computer to provide device software and firmware updates, query the device as to its status, etc.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIGS. 5A-5C are electronic schematic diagrams of a wireless communications module of the time and attendance device of the present invention;

DETAILED DESCRIPTION OF THE PREFERRED EMBODIMENTS

Figure 1:
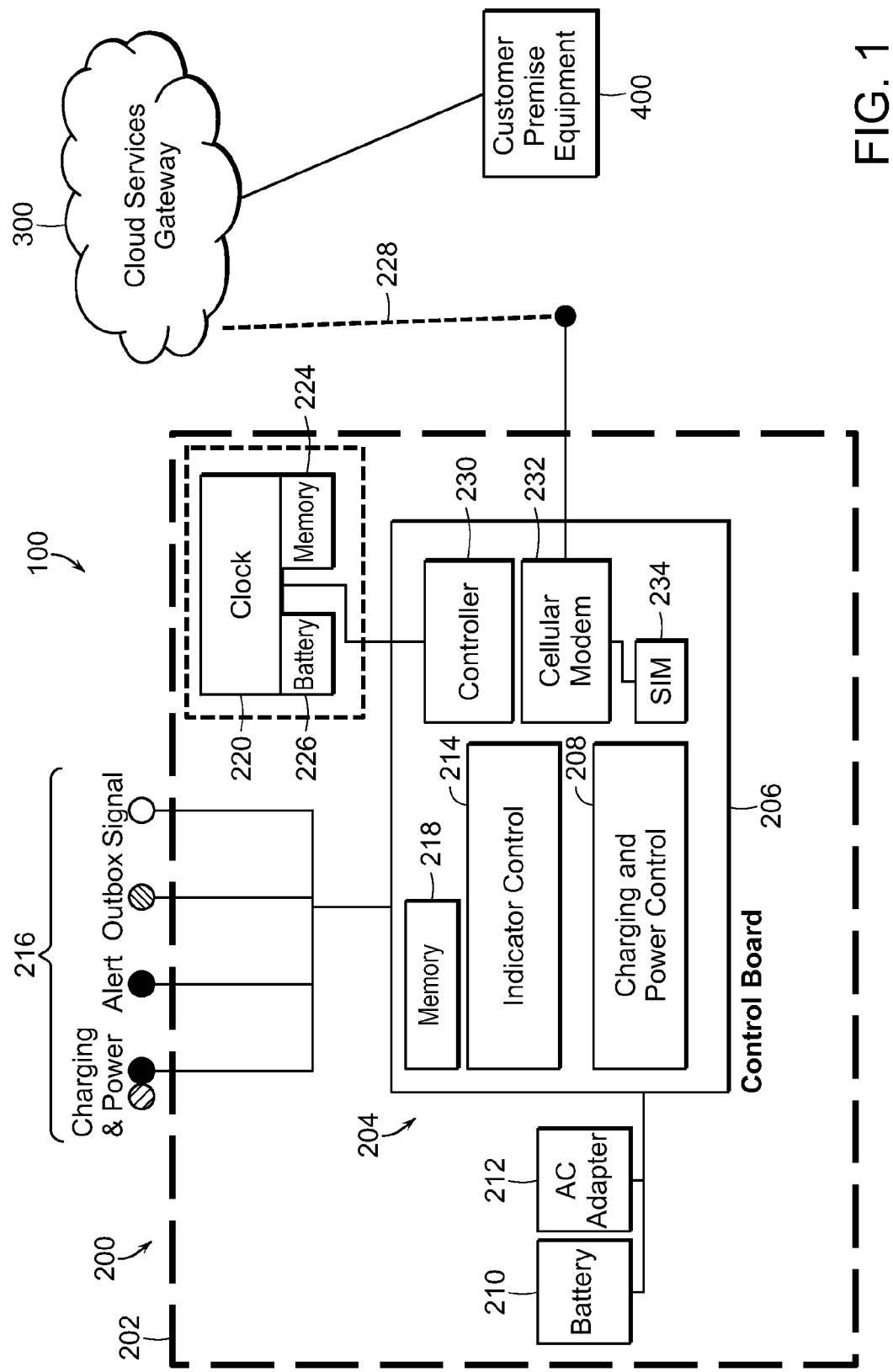
FIG. 1 is a diagrammatic view of the portable time and attendance device and system for tracking and communicating time attendance data for workers at remote worksites, in accordance with the present invention.

As shown in the accompanying drawings, for purposes of illustration and explanation, the present invention resides in a system and method for tracking and communicating time attendance data for workers at a remote worksite. As will be more fully described herein, the time and attendance device is configured to receive and store worker time attendance data and transmit data to a remote computer, typically a server of a gateway service, via a wireless network, preferably a wireless cellular communications network.

The time and attendance device is configured to receive power by means of alternating current from a power grid of the local municipality, or also by means of battery power. The batteries can be rechargeable or replaceable. The system and device are configured and designed so as to conserve battery power and use very low power over operational time. This results in the device being powered by the primary battery for several weeks at a time without need of recharging or replacing the battery. Furthermore, in the event that the main battery becomes critically low, a backup second battery powers a electronic time clock portion of the device such that worker time and attendance data can be received and stored by the electronic time clock for later transmission when the main battery is recharged, replaced, or a source of alternating current is supplied to the device. The backup battery can provide power to the electronic time clock and allow it to perform its very limited functions for up to several additional months.

The system and method of the present invention enables workers to clock in and clock out using the time attendance device at the remote job location, while allowing the employer or management to have updated information on a periodic basis. The periodic basis may be set to every hour that there are new time and attendance data entries, every few minutes, at certain times of the day, at the end of the day, at the end of the week, at the end of the work period, at the end of the pay period, etc., as determined and configured by the manufacturer or user of the time attendance device.

Depending upon the pre-established periodic basis that the new worker time and attendance data is transmitted, this enables employers and managers to know who is on the jobsite and when they arrived. By extrapolation, they will know who is not on the jobsite when they should be. This knowledge allows exceptions to be handled as they occur, rather than at the end of the work week or pay period when the time is recorded in the normal course of action with other disconnected systems. This also permits management to know who is tardy, on time, or early in near-real-time. Exceptions, such as missing time punch data when the worker forgets to clock in or clock out can be addressed quickly and proximately to the time they occur rather than several weeks or days later. This also permits the employee to more accurately recall the time they arrived or left rather than trying to recall this information many days or weeks later. The system of the present invention also assists with security, safety and compliance by knowing where the workers are.

With reference now to FIG. 1, a diagrammatic illustration is provided showing the architecture of the system 100 of the present invention. The system 100 comprises a portable time and attendance device 200 which is configured to receive and store worker time attendance data and transmit the data to a remote computer 300, which is typically a server such as a cloud-based server, that acts as a gateway service between the portable time and attendance device 200 and the customer premise equipment or computer 400, which is typically the one or more computers of the general contractor, manufacturing company, or other company which is using or owns the portable time and attendance device 200 and whose workers are utilizing the device 200 at a remote worksite.

It is contemplated by the present invention that the portable time and attendance device 200 could communicate directly with the customer's computer 400. However, it has been found that using the remote computer or server of the cloud service's gateway 300 provides benefits. Passing the time and attendance data, and other data such as the operational status of the device 200 through the gateway service 300 allows the gateway service information technology personnel to handle all issues and configurations, which will be pre-established so that purchase, configuration, and use of the device 200 by the end user will take very little time and effort. Moreover, passing the data through the gateway service 300 avoids having to send the data to an office through a firewall, and eliminates risks for attacks via the Internet by spyware, malware, etc. Furthermore, if the time and attendance device 200 is experiencing operational issues the gateway service 300 is able to recognize these issues and either address or correct them as needed or contact the end user customer, such as when the primary battery of the device 200 needs to be recharged or replaced. The gateway service 300 can parse or remove data relating to the operational functioning of the device 200, and instead only save the relevant worker time and attendance data for later retrieval by the end user customer or forward such data to the end user customer as is determined by these parties.

Figure 2:
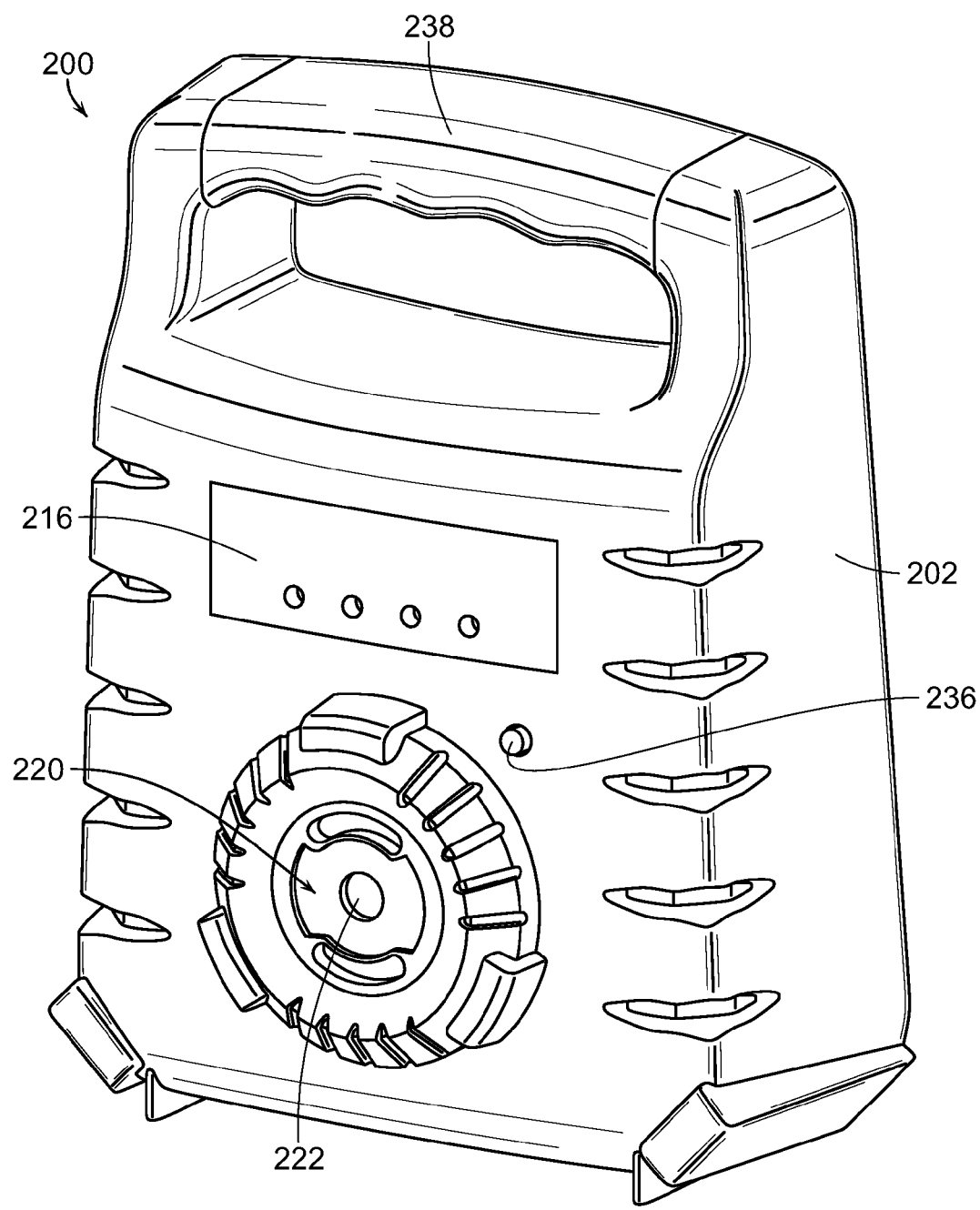
FIG. 2 is a front perspective view of a portable time and attendance device embodying the present invention.
Figure 3A:
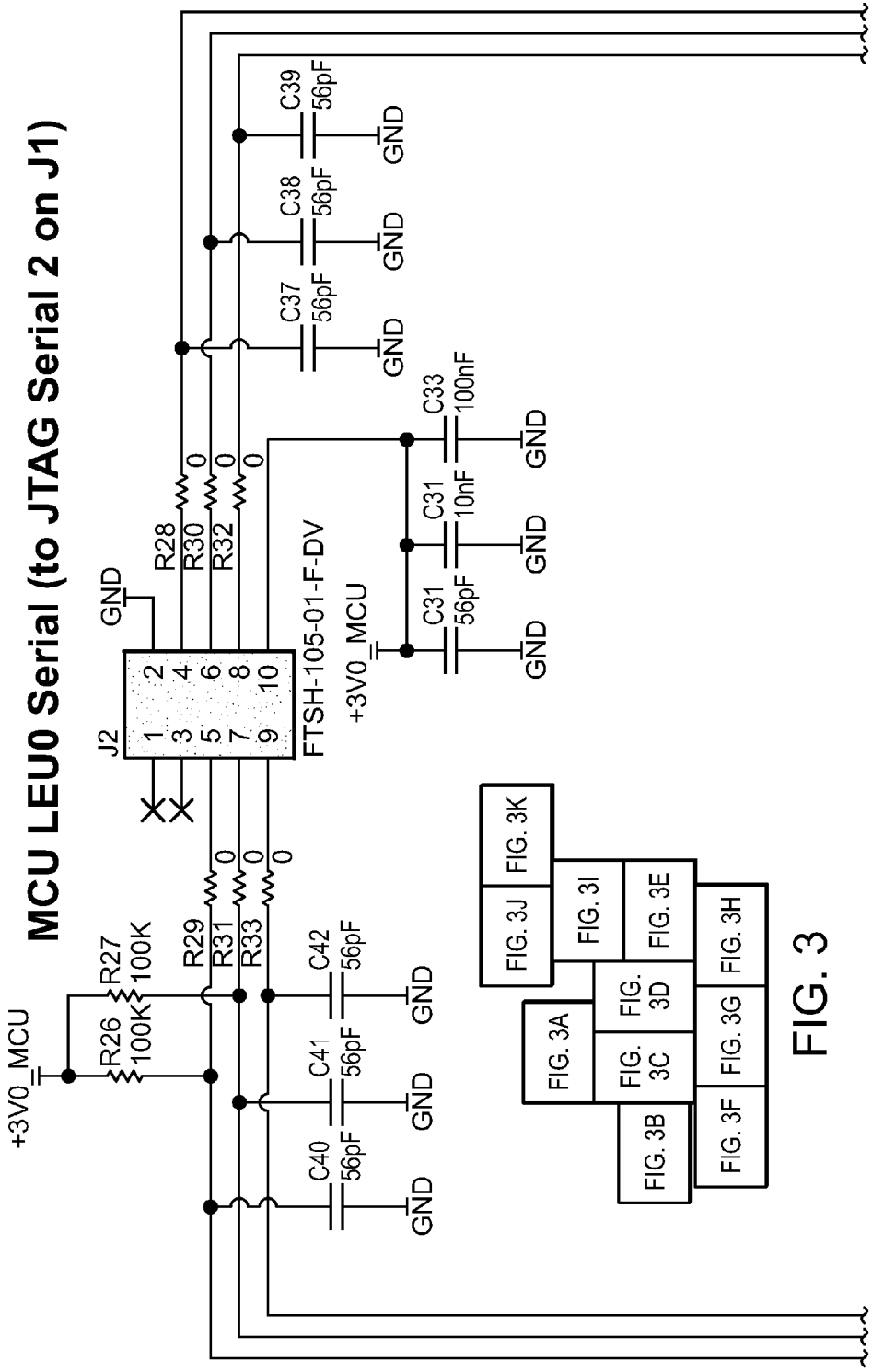
FIGS. 3A-3K are electronic schematics for the microcontroller unit and related electronic components of the portable time and attendance device.
Figure 3B:
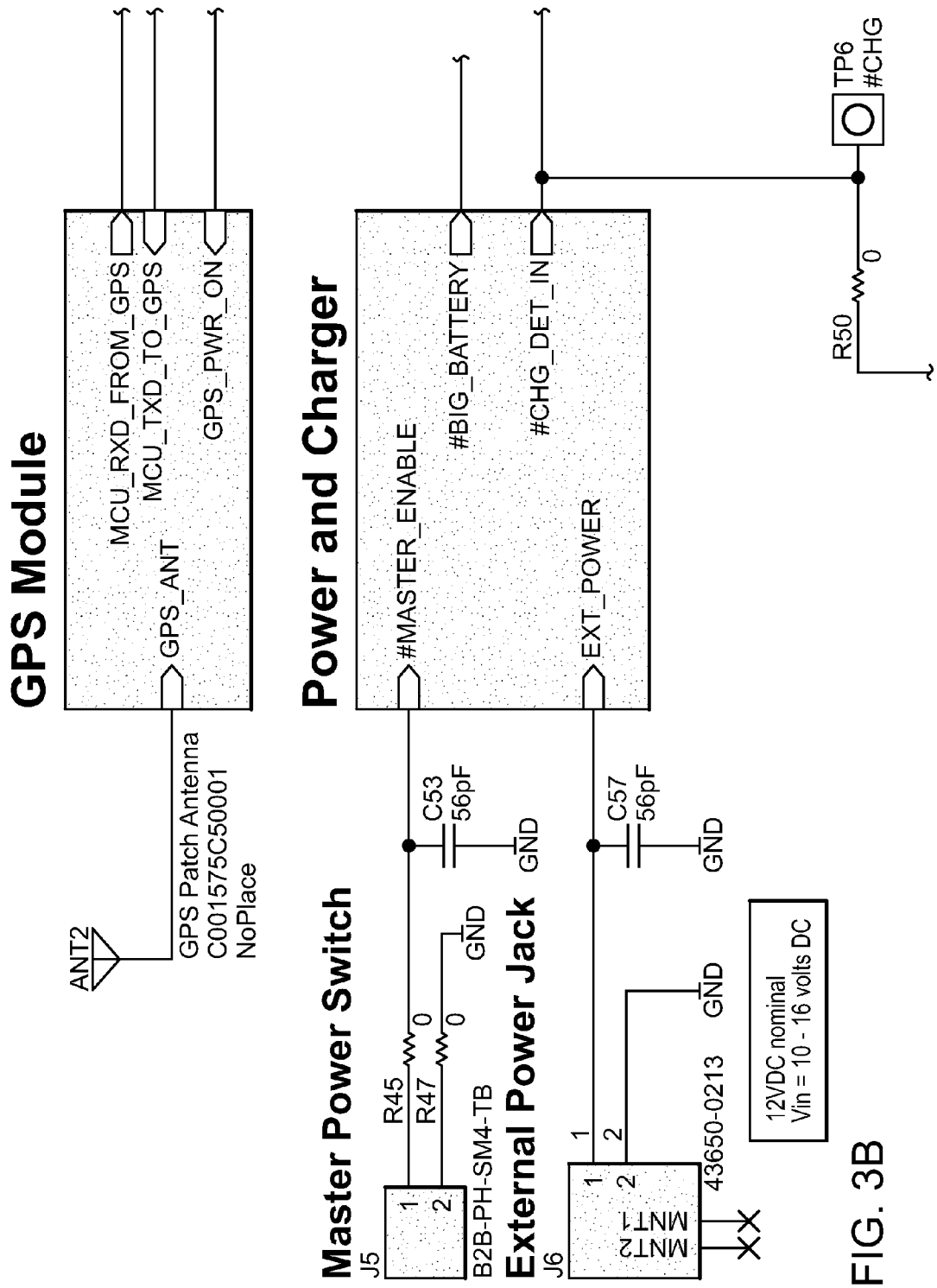
Figure 3C:
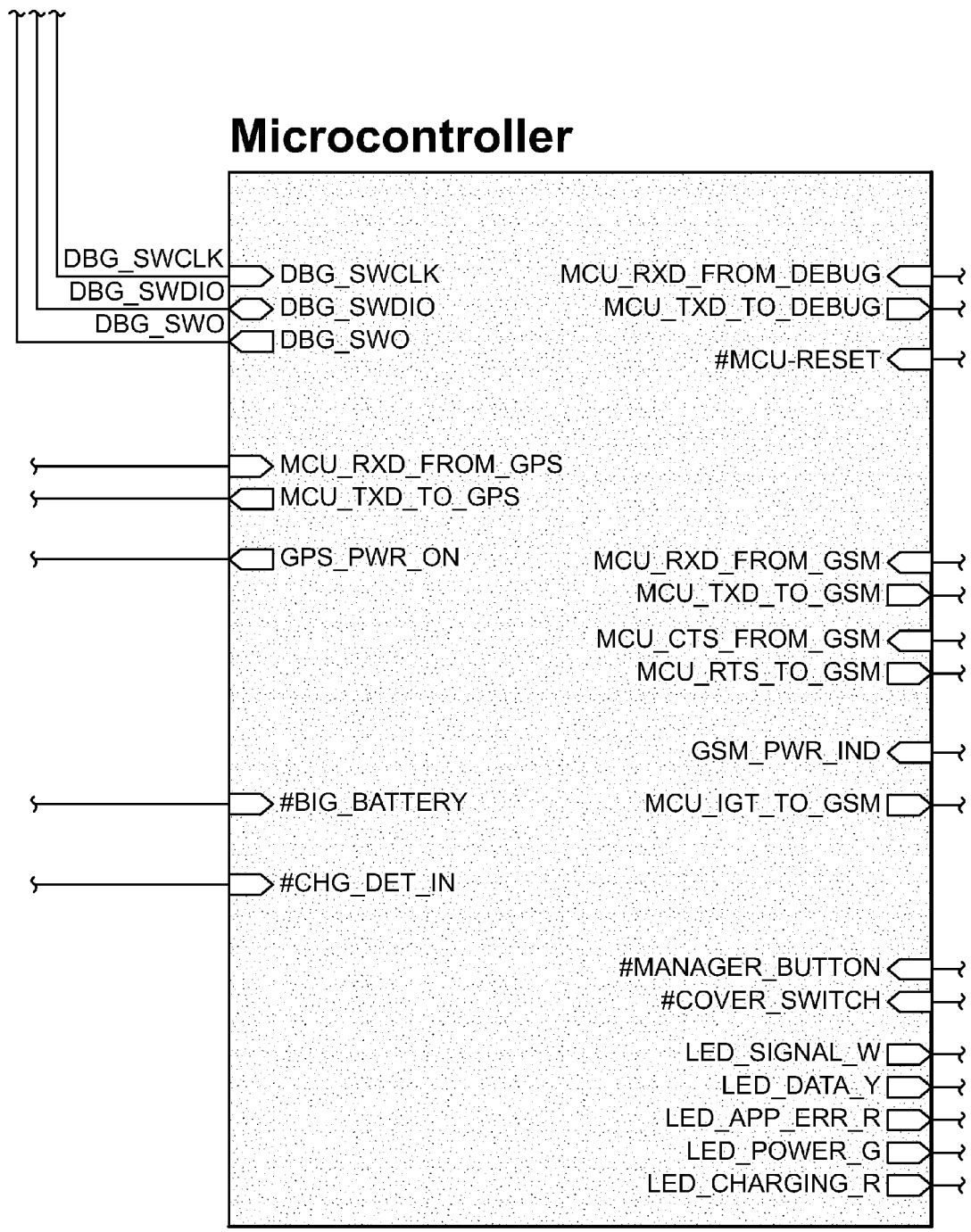
Figure 3D:
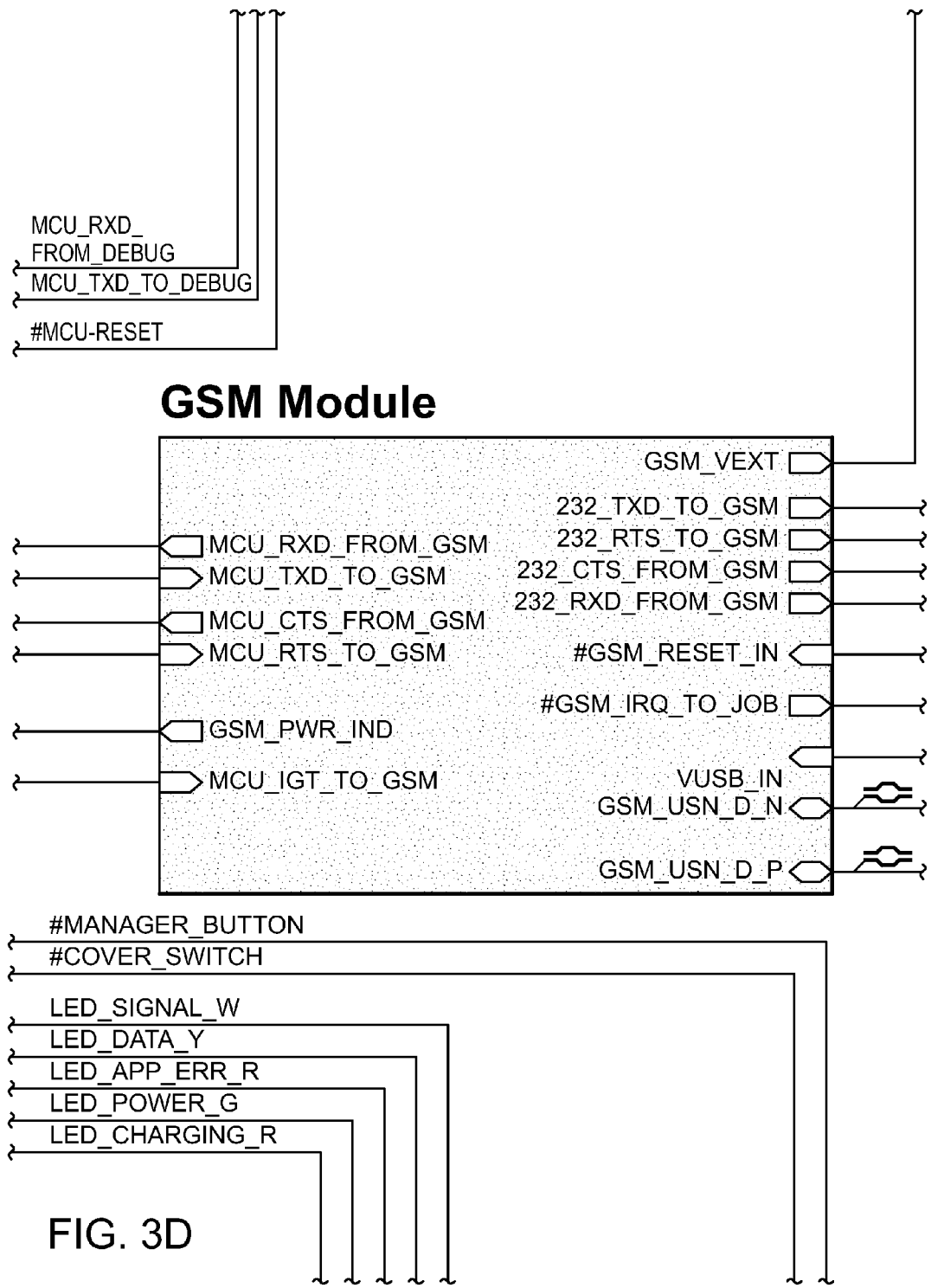
Figure 3E:
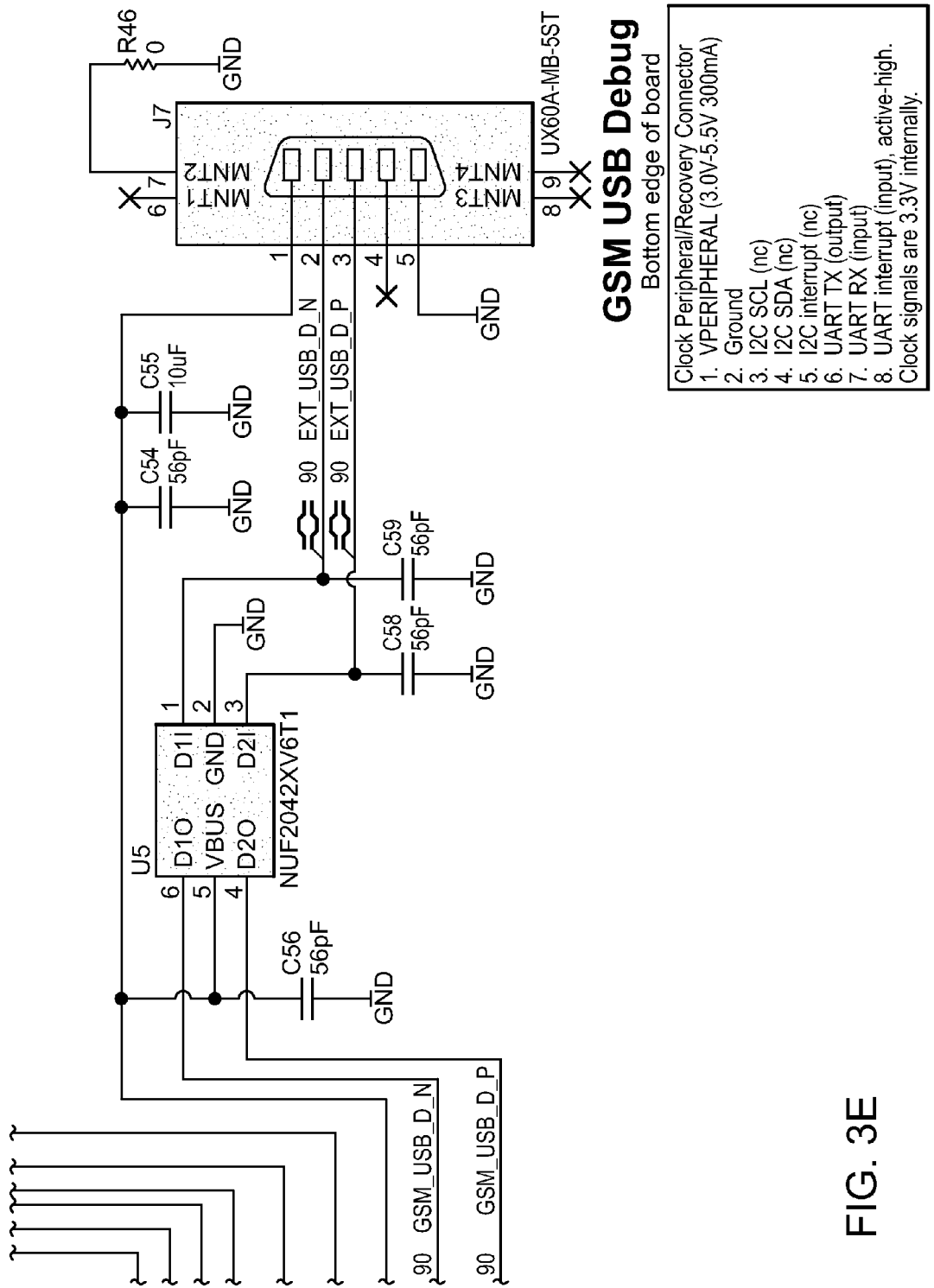
Figure 3F:
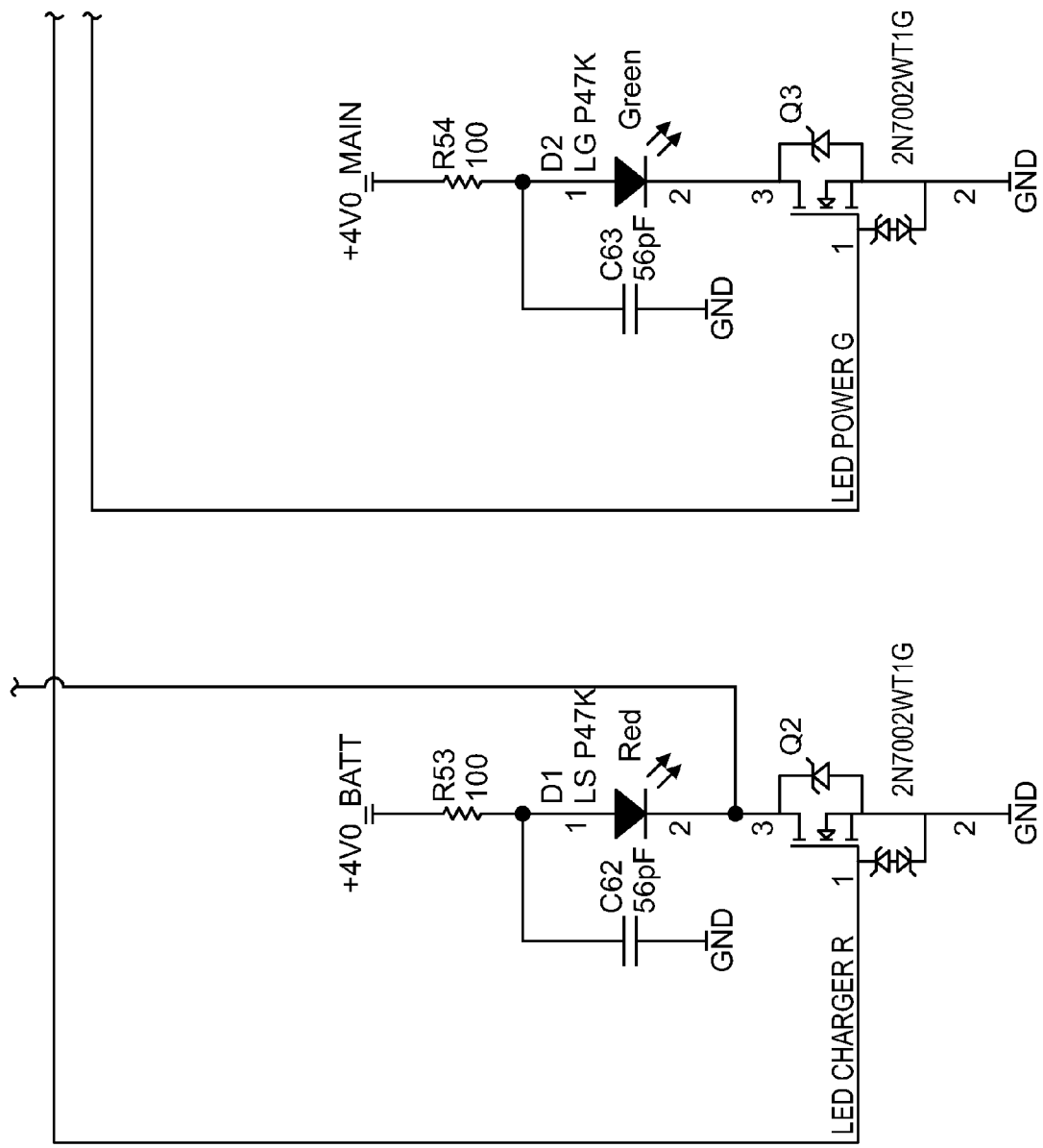
Figure 3G:
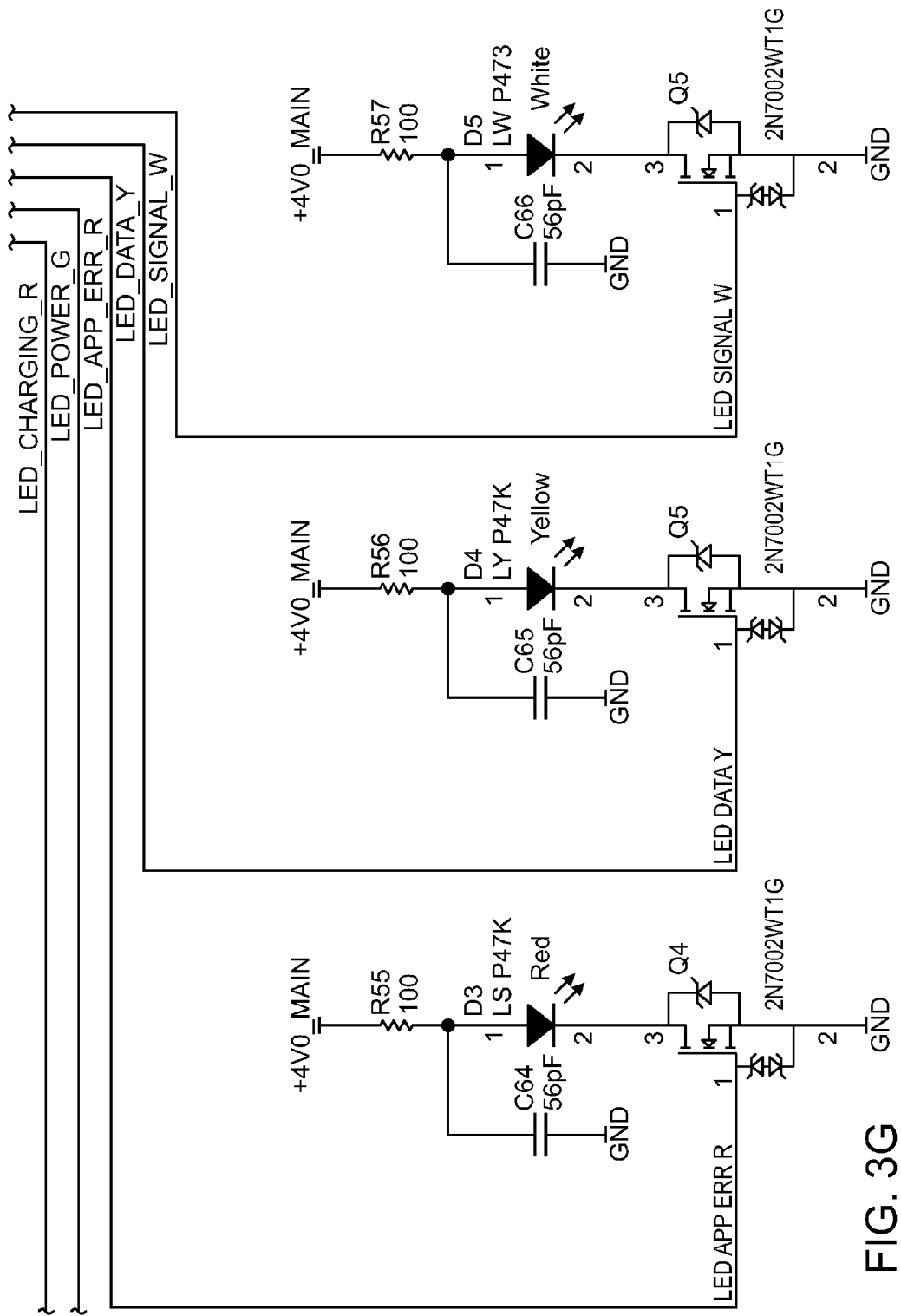
Figure 3H:
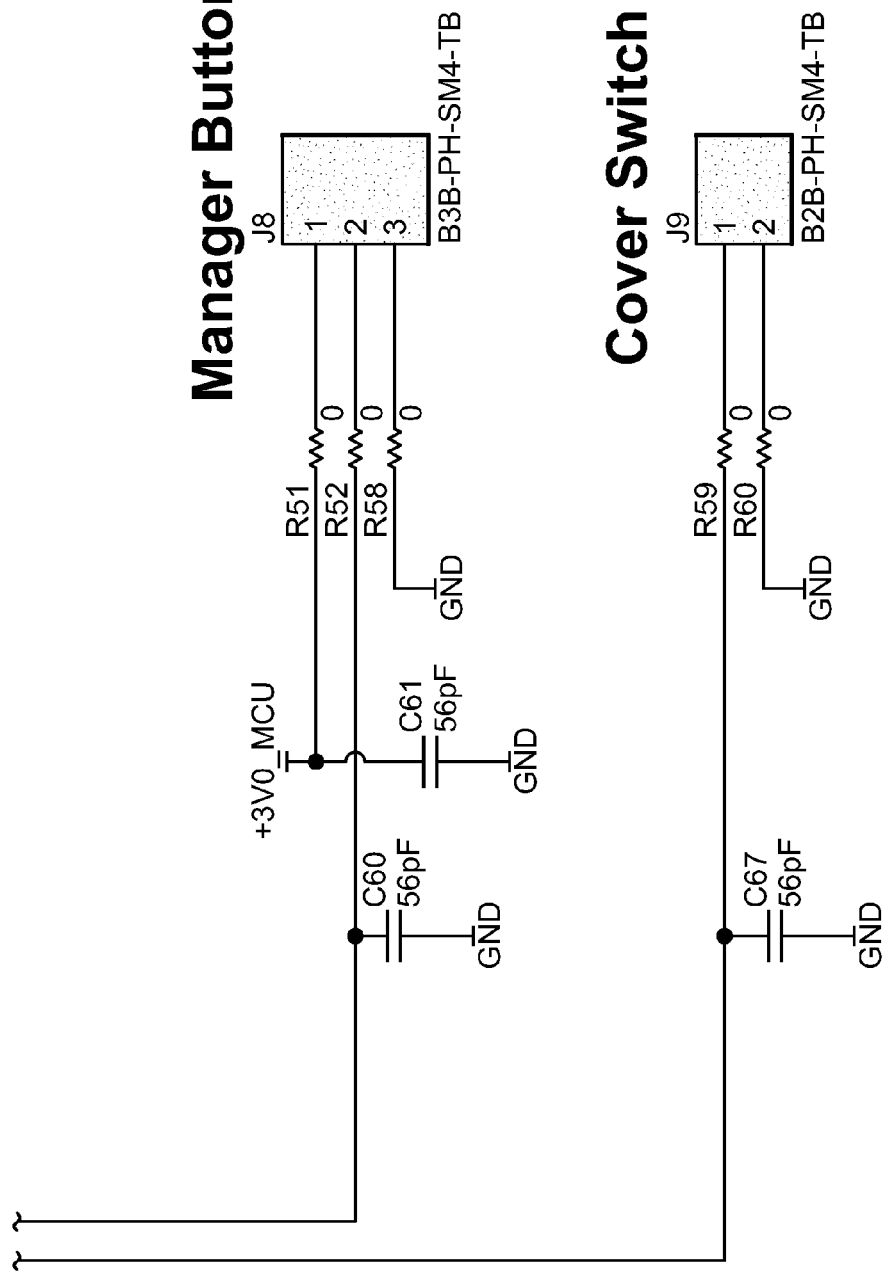
Figure 3I:
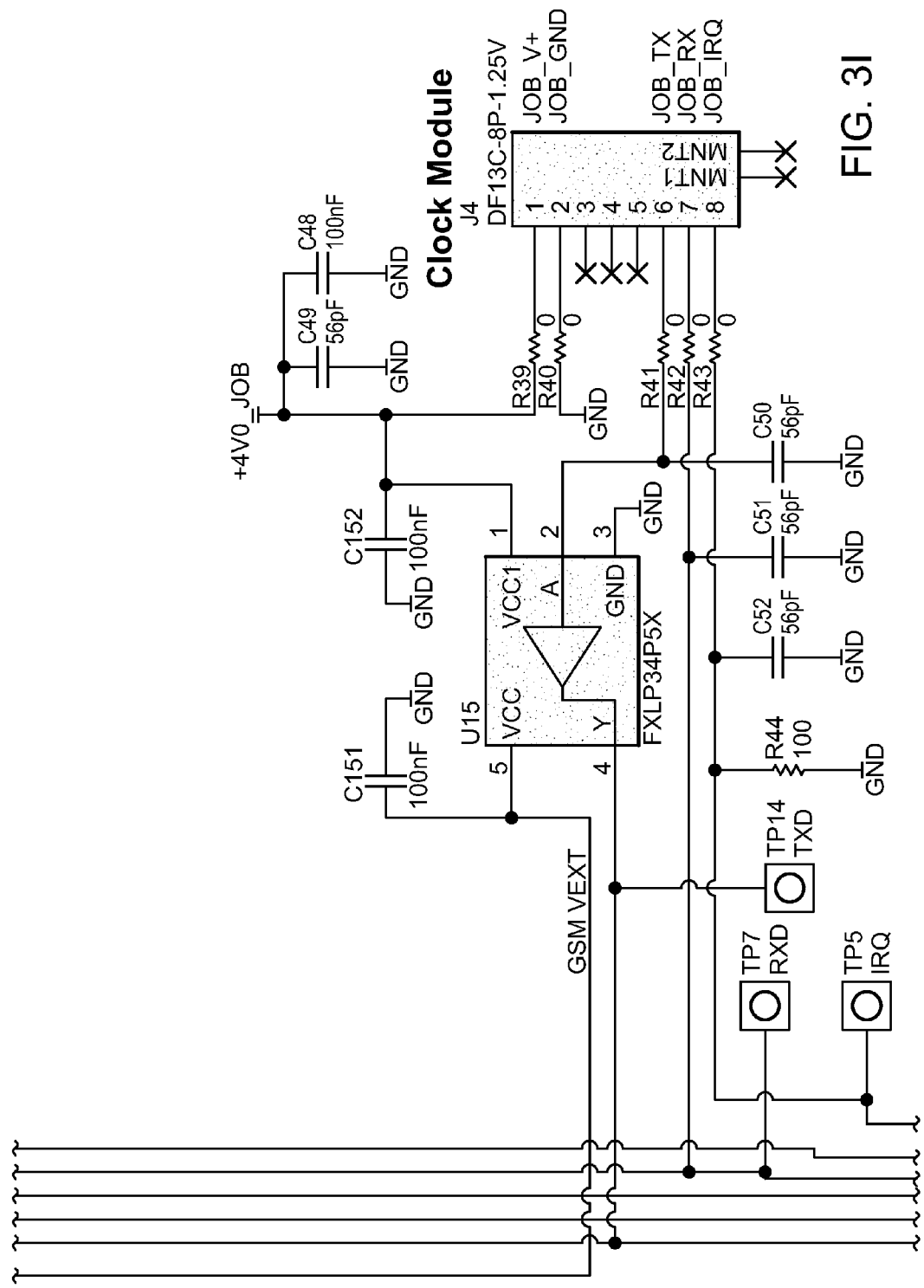
Figure 3J:
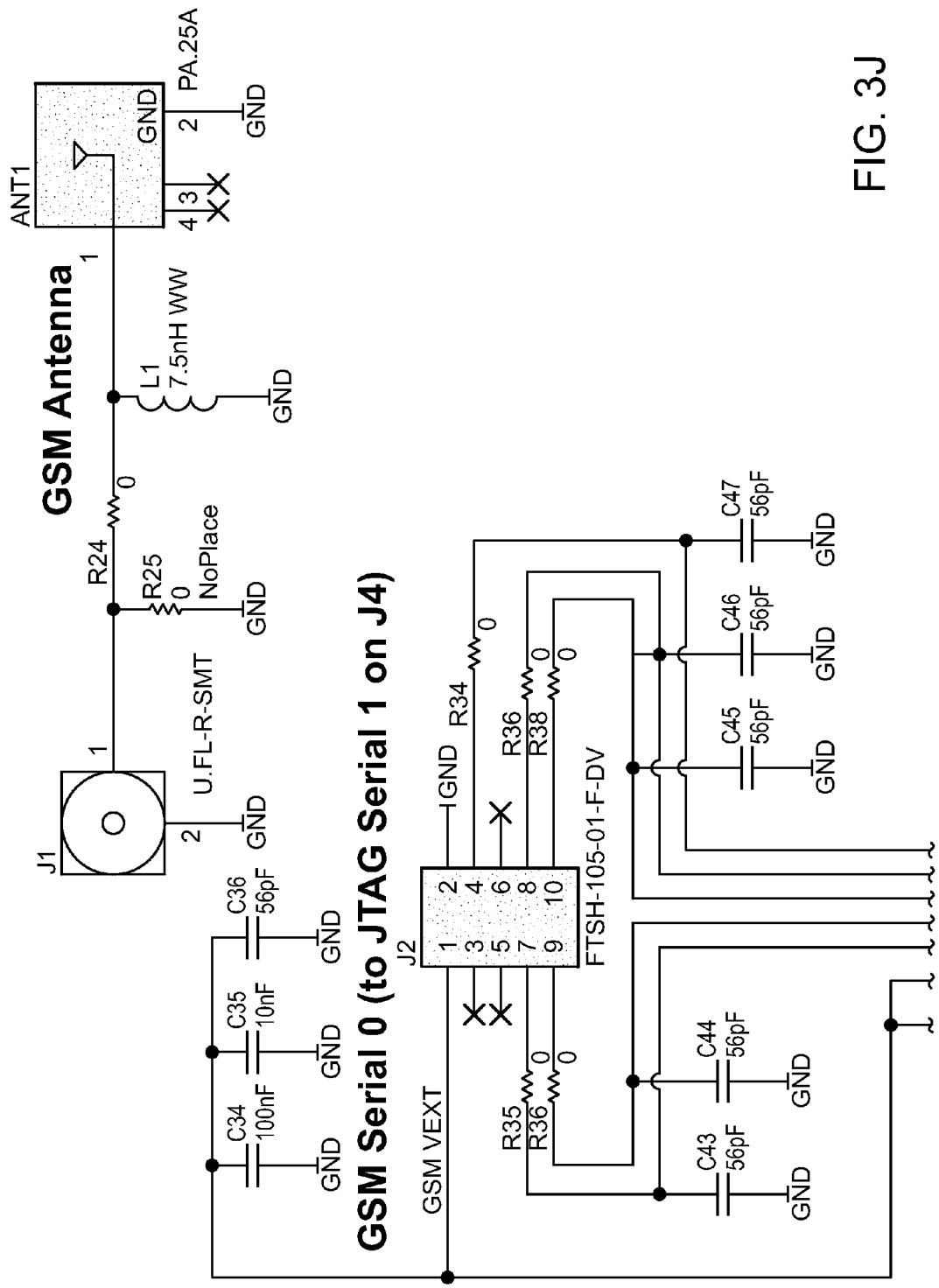
Figure 3K:
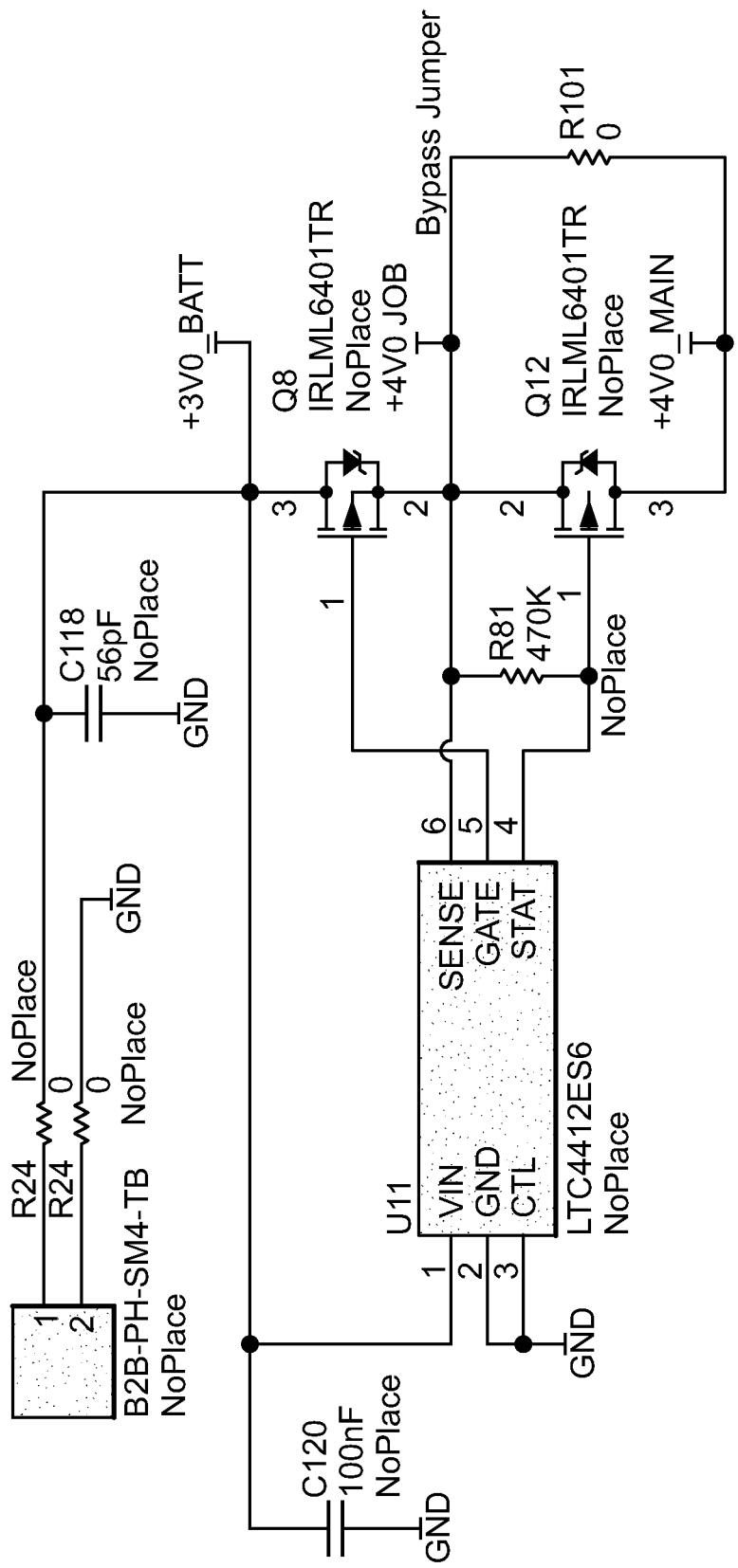
Figure 4A:
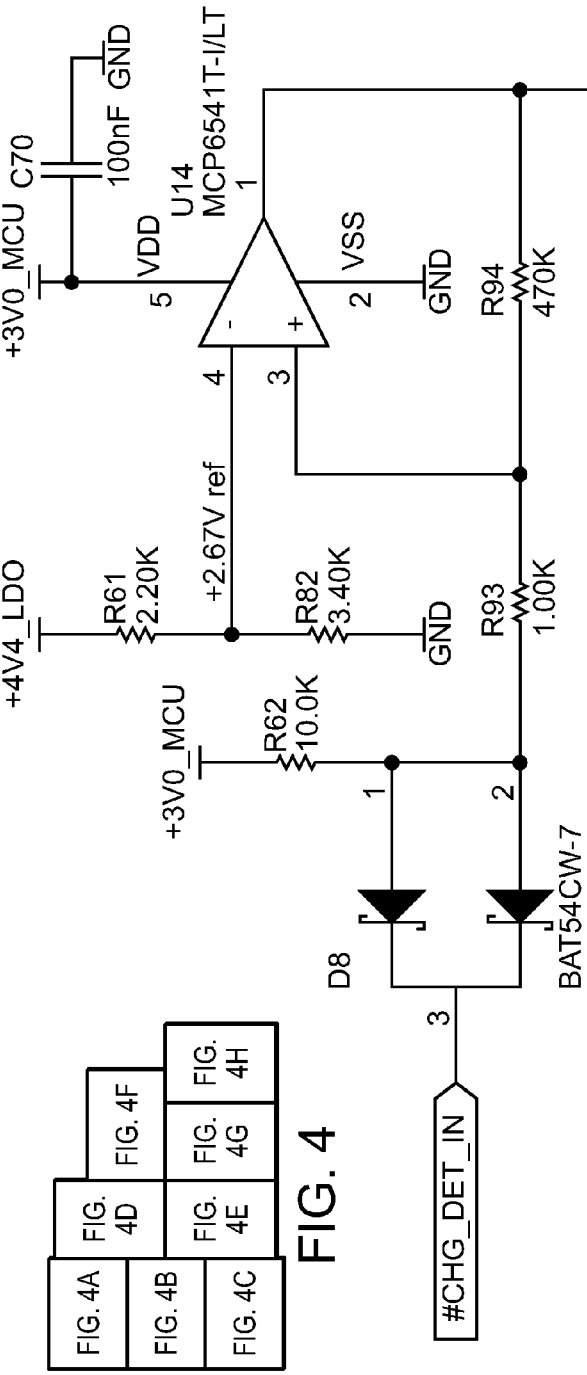
FIGS. 4A-4H are electronic schematic diagrams illustrating the main control unit of the time and attendance device of the present invention.
Figure 4B:
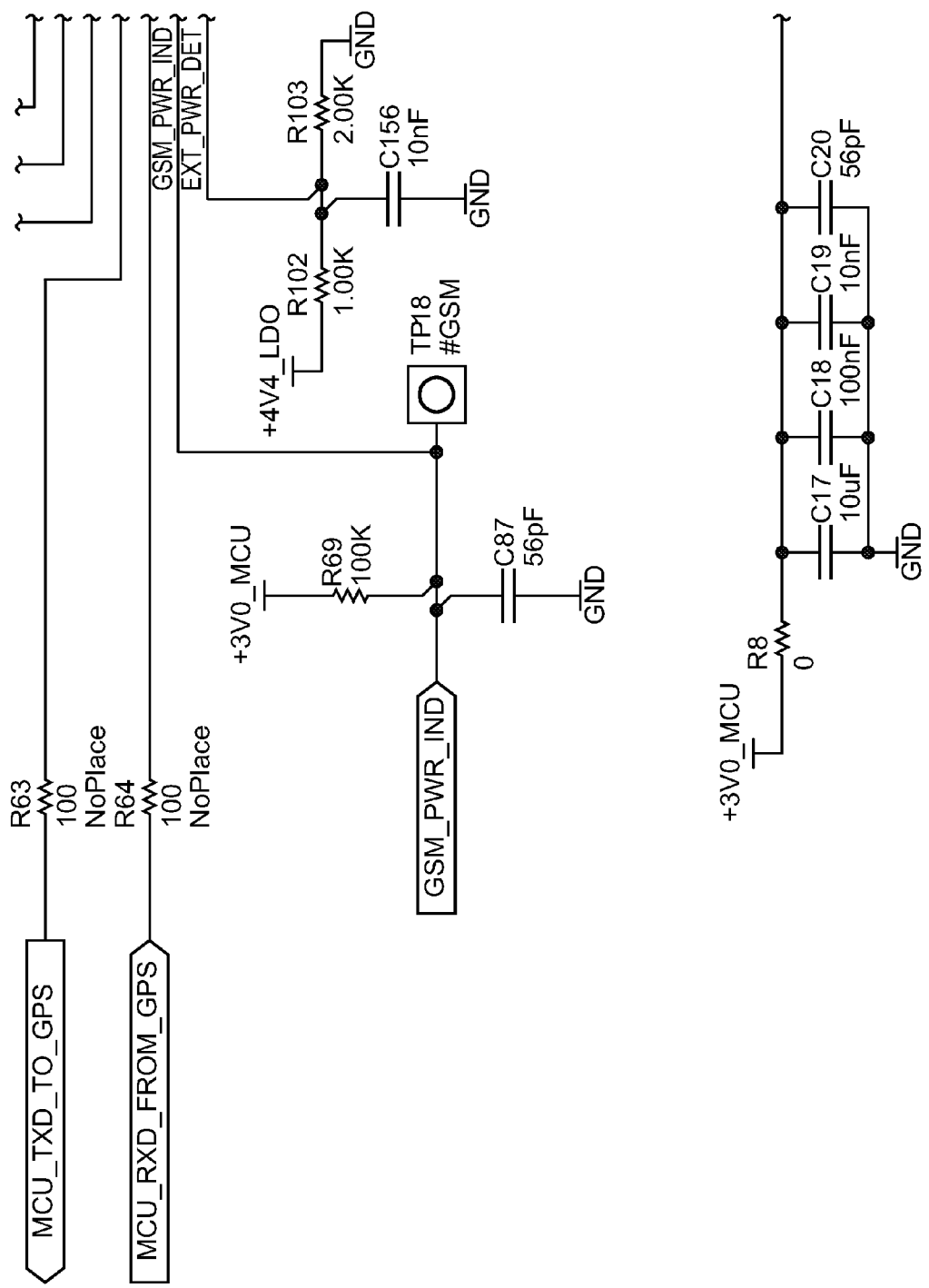
Figure 4C:
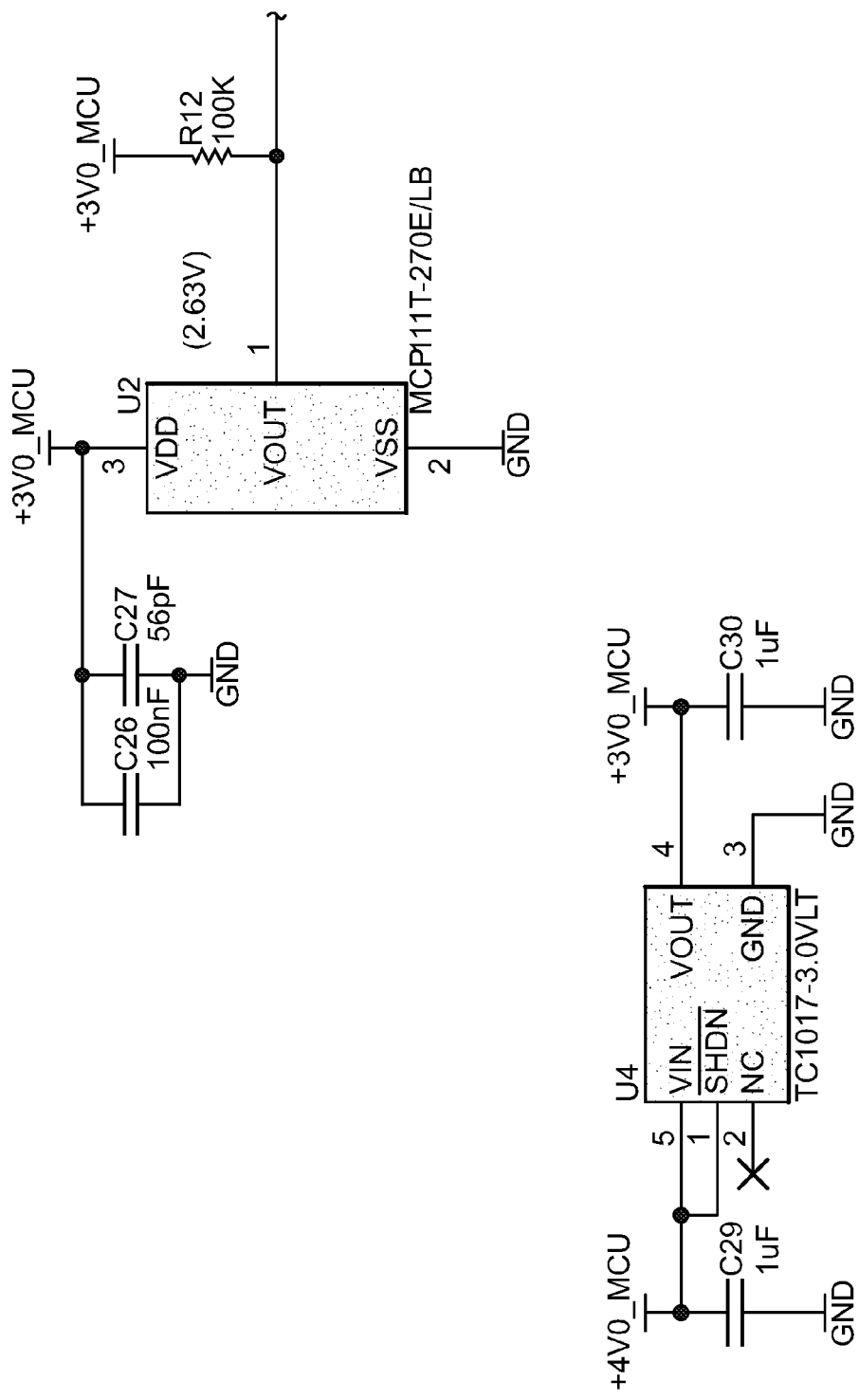
Figure 4D:
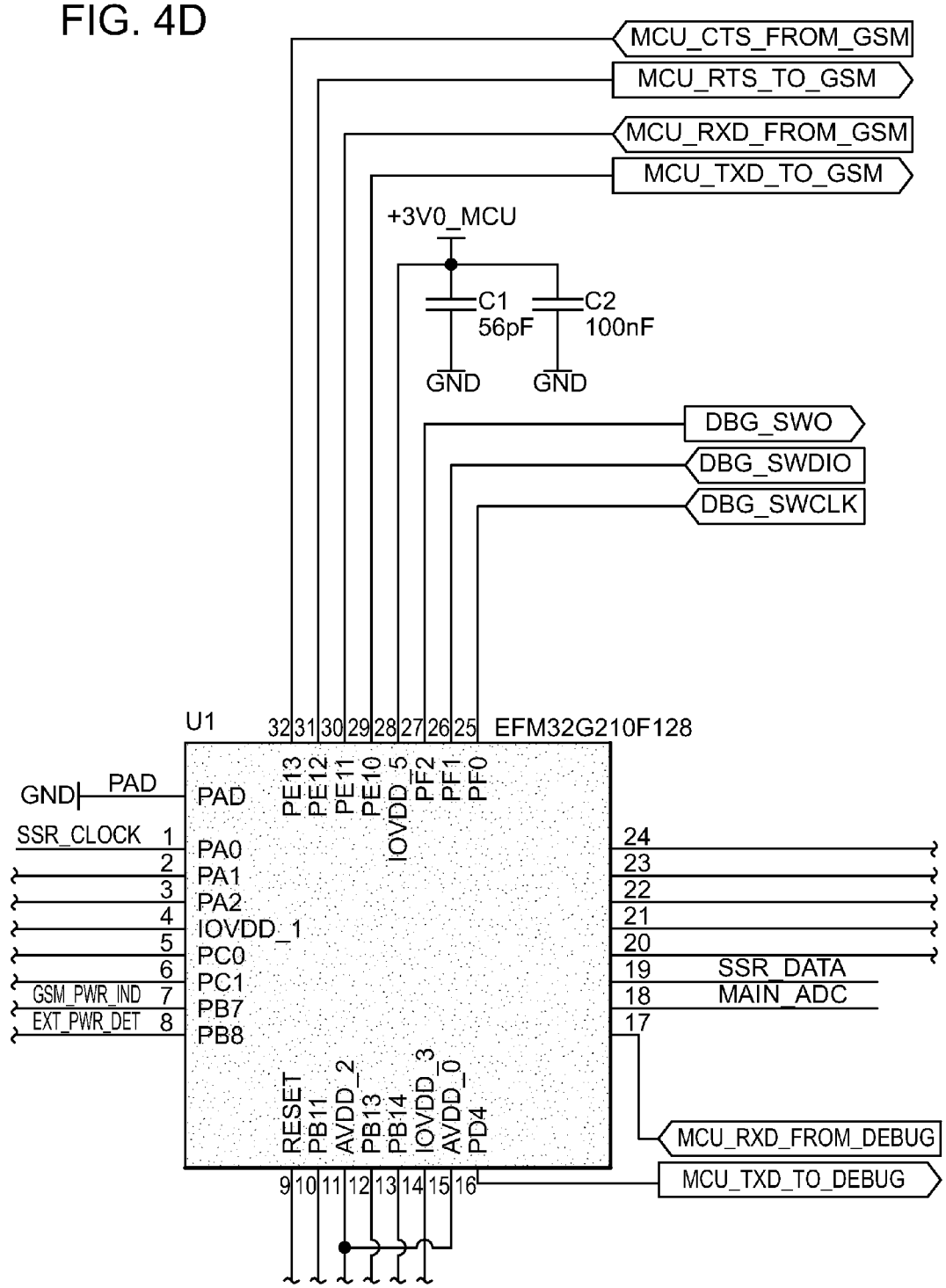
Figure 4E:
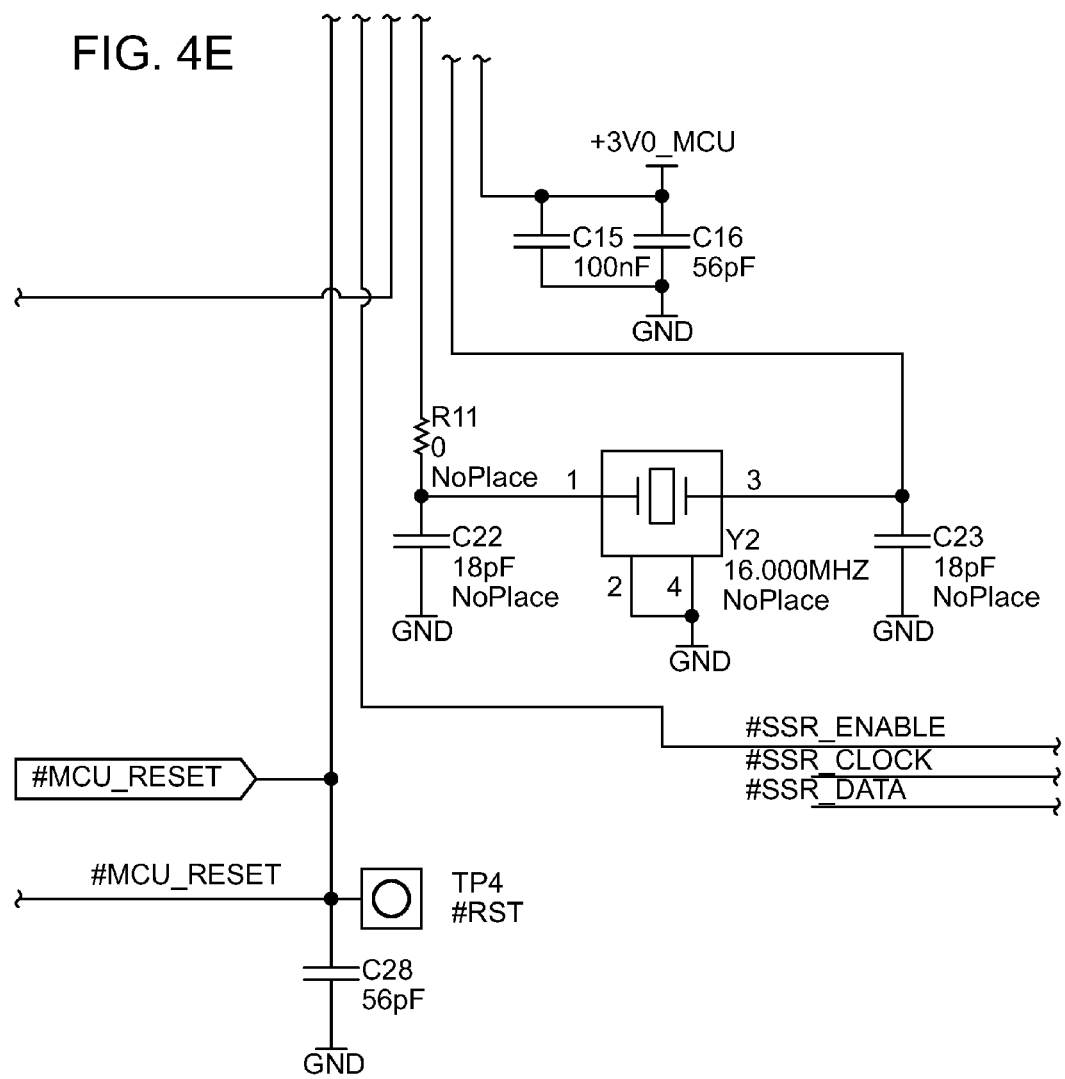
Figure 4F:
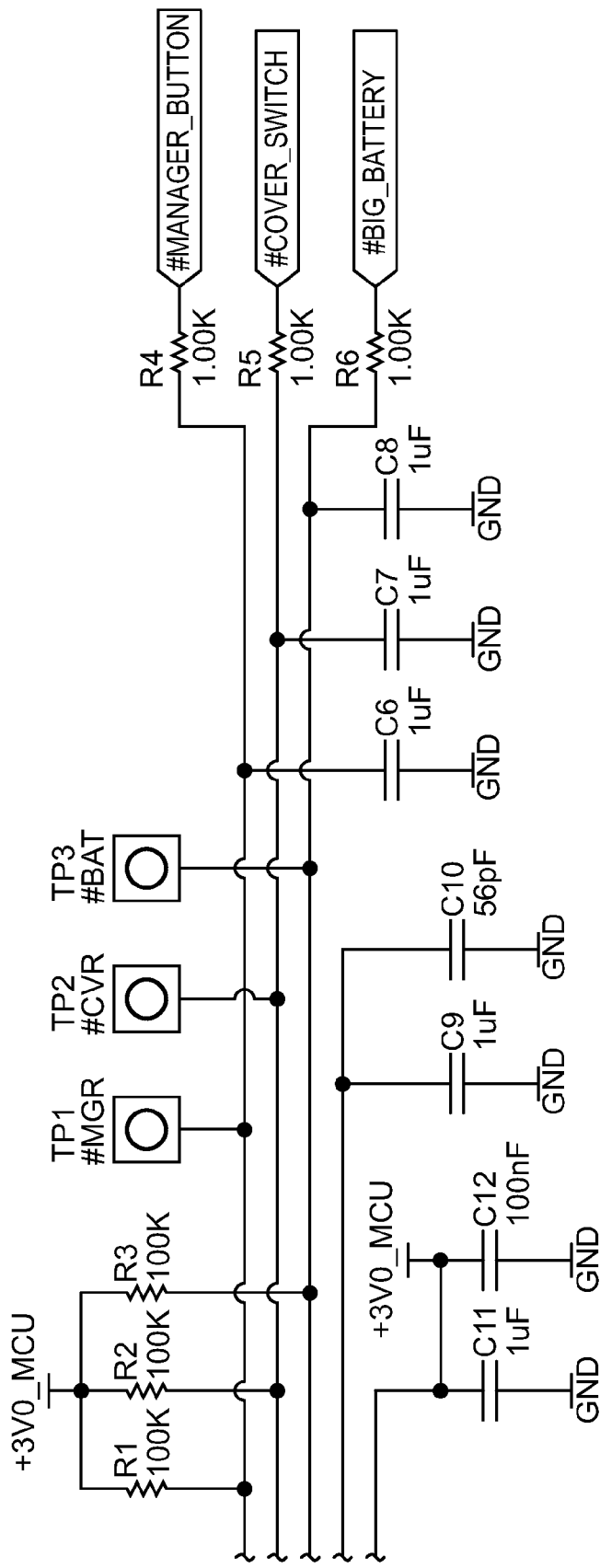
Figure 4G:
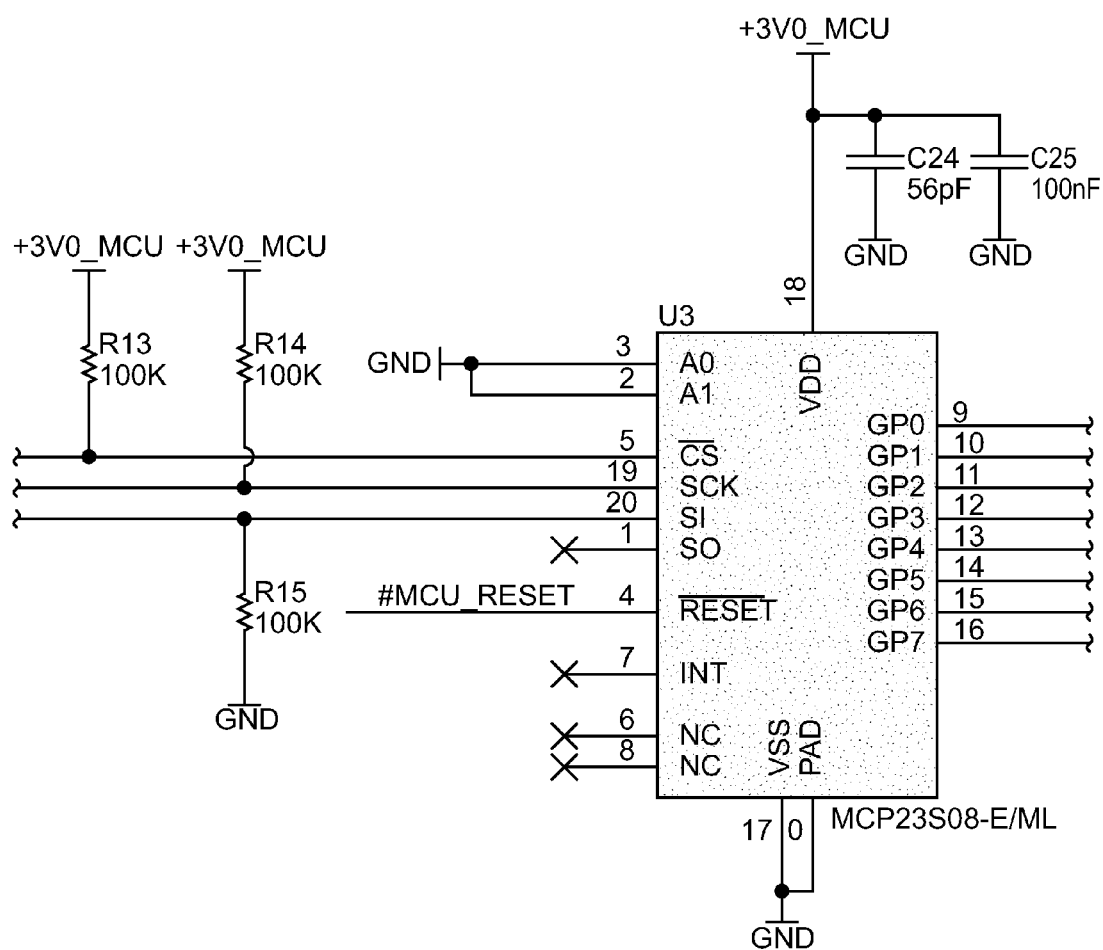
Figure 4H:
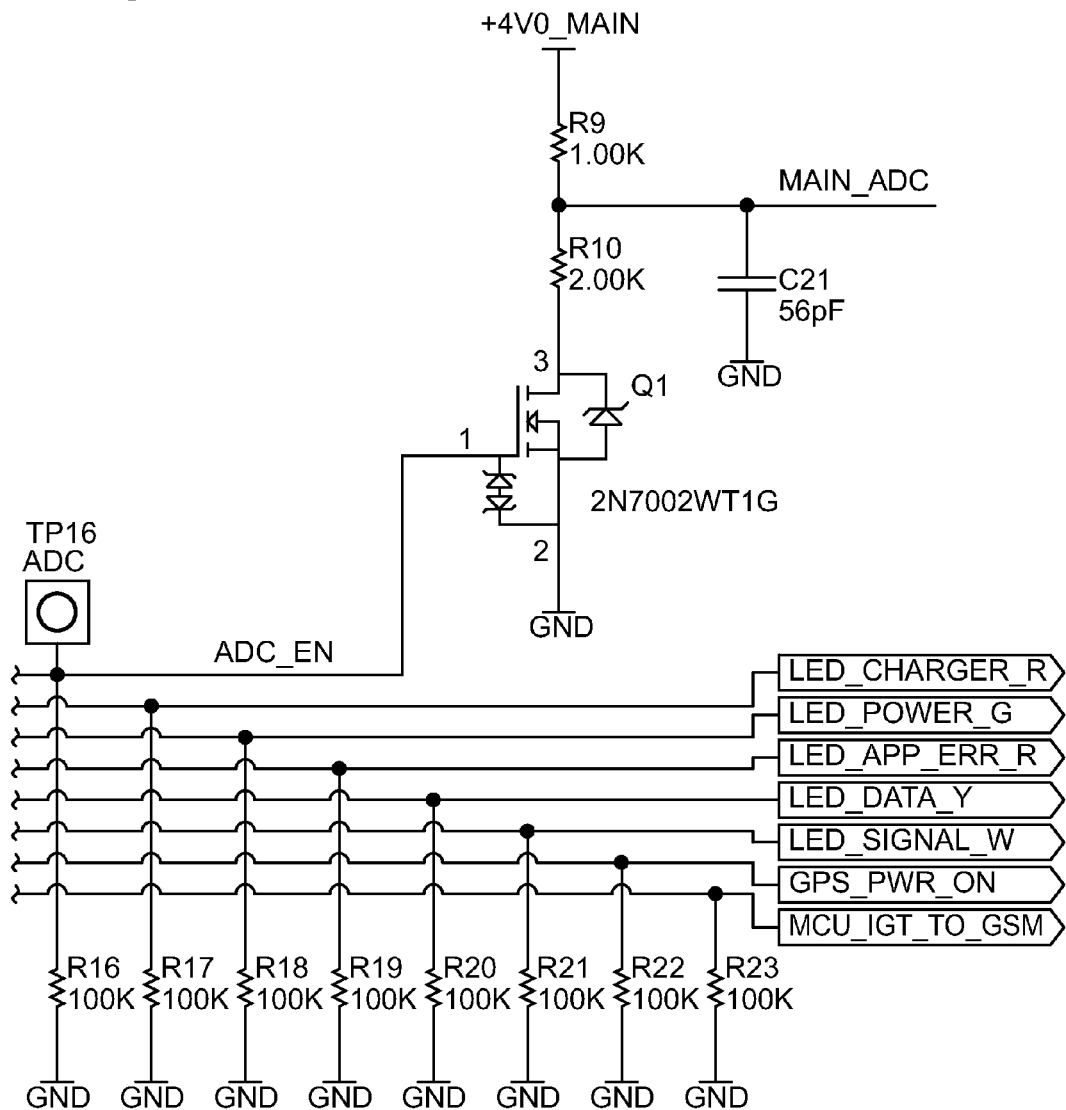

With reference to FIGS. 1 and 2, the device 200 includes a case or housing 202 which houses the various electronic components, modules, etc. The device 200 includes what is referred to herein as a main unit 204 which includes a main microcontroller or control board 206. The MCU 206 includes a charging and power control circuit 208 which connects to the battery 210 and alternating current (AC) adapter 212. The charging and power control circuitry, battery 210 and AC adapter are collectively referred to herein as a power module. The battery 210 is considered to be the primary battery of the entire device 200. Although the battery 210 may comprise one or more batteries which may be replaceable, typically the one or more batteries 210 are rechargeable. The battery 210 is only used when there is no AC power supplied to the AC adapter 212. The main control board 206 also includes indicator control circuitry 214 which control the illumination of a plurality of LEDs 216, as will be more fully described herein. The main control unit 204 also includes electronic memory 218 which can be used to store any necessary firmware, software, updates, worker time and attendance data as they are pulled from the electronic clock 220 of the device, etc.

The electronic time clock 220 is in electronic communication with the main unit 204. However, it is considered by the present invention to be a distinct component, module or unit from the main unit 204, and in fact may comprise a physically separate electronic time clock which may be housed within or otherwise associated with the case or housing 202. For example, the electronic time clock 220 may comprise the time clock described in U.S. Pat. No. 7,298,673 B2, the contents of which are incorporated herein by reference. In such a case, an electrical contact 222, as illustrated in FIG. 2, would be accessible for a worker to touch a KeyTab™ thereto, such that the worker can clock in and clock out as described in the '673 patent. However, it will be appreciated by those skilled in the art that the electronic clock 220 can comprise any suitable time keeping clock which can receive and store worker time and attendance data by any other means. However, preferably, the time clock 220 of the device 200 will not require powerhungry input mechanisms, such as an LCD touch screen, or the like, in order to conserve the main battery 210 power for prolonged periods of time.

As shown in FIG. 2, the electronic time clock 220 includes an internal clock for associating a date and time stamp or record with each worker clock-in or clock-out time and attendance event. In accordance with the present invention, this is saved to electronic memory 224 associated with the electronic time clock for later retrieval by the main unit 204.

The electronic time clock 220 also includes a second backup battery 226. Typically, the electronic time clock 220 will receive its power from the AC power adapter 212 or the primary battery 210 of the device 200. However, when AC power is not available and when the level of power available within the primary battery 210 becomes exhausted or too low to operate the time clock 220, the time clock 220 reverts to its own secondary battery 226. In such cases, the device 200 is configured such that the secondary battery 226 operates only at the time clock 220 such that the time clock 220 can receive worker time and attendance data as workers clock in and clock out, time and date stamp these records, and save them within memory 224 for later retrieval and transmission. The battery 226, which is typically one or more lithium batteries, is able to service the electronic time clock 220 with these minimal functions for several weeks to several months at a time.

It is anticipated that during this time, either AC power will be supplied to the device 200 or the main battery 210 will either be replaced or recharged, such that the worker time and attendance data may be retrieved from memory 224 and transmitted by the device 200. However, worker time and attendance data acquired during that time will not be lost. In fact, depending upon the type of electronic time clock 220 used, such as the time clock illustrated and described in the aforementioned '673 patent, the electronic time clock 220 may include an infrared or Bluetooth functionality for communicating directly with a handheld device held within range of the electronic time clock 220. Thus, in these unusual and emergency situations worker time and attendance data can be retrieved from the device 200 without transmitting to the gateway service 300.

As mentioned above, the electronic time clock 220 portion of the device 200 is in electronic communication with the main unit 204. Typically, the electronic time clock 220 is electronically connected to a wireless communications module of the main unit 204. Such a communications module may be a separate unit which is electronically tied to the time and attendance clock 220 and the main control board and other electronic components of the main unit 204, or comprise the necessary microcontrollers, circuitry, modems, etc. built integrally with the main unit 204. In the case of a distinct separate unit within the housing 202 but interconnected between the electronic time clock 220 and the main unit control circuitry 204, an exemplary module may comprise a cellular modem with embedded Java engine, such as the Cinterion TC65i. In any event, the communications module includes the necessary electronics and devices to communicate with a wireless data network, represented by the dash line 228 in FIG. 1, such as a GSM Network, which may comprise, for example, a wireless cellular communications network, such as the AT&T Network, using necessary technology for data communications, such as Edge/2G, 3G, or the like. Of course, it will be appreciated that different wireless modules and cellular data communications network could be used in the present invention.

With reference again to FIG. 1, the communications module comprises a controller 230 which operates the communications module and interfaces with the electronic time clock 220, a cellular modem 232, such as an GSM Radio Quad Band modem or the like, and a Subscriber Identity Module (SIM) card 234 so as to provide the specific subscriber identity of the time attendance device 200. This enables the remote receiving computer 300 to be able to identify the device 200 and its owner.

With reference to FIGS. 3A-3K, electronic schematics are shown of the various modules and electronic components of the device 200, including the MCU or control board 206, the power module 208-212, the communications module 230-234, the indicator control circuitry and LEDs 214-216, and the electronic time clock 220.

Also shown in FIGS. 3 and 7 is a Global Positioning System (GPS) module which can be incorporated into the device 200 for providing GPS location of the time and attendance device 200, such that the employer or manager or the like can readily identify the location of the device 200 and associated jobsite. This can be important as in some industries the jobsite locations vary over time, such as in the construction industry.

With reference now to FIGS. 4A-4H, electronic schematic diagrams are shown for the microcontroller unit or control board 206, and related components, such as the LEDs 216.

Figure 5B:
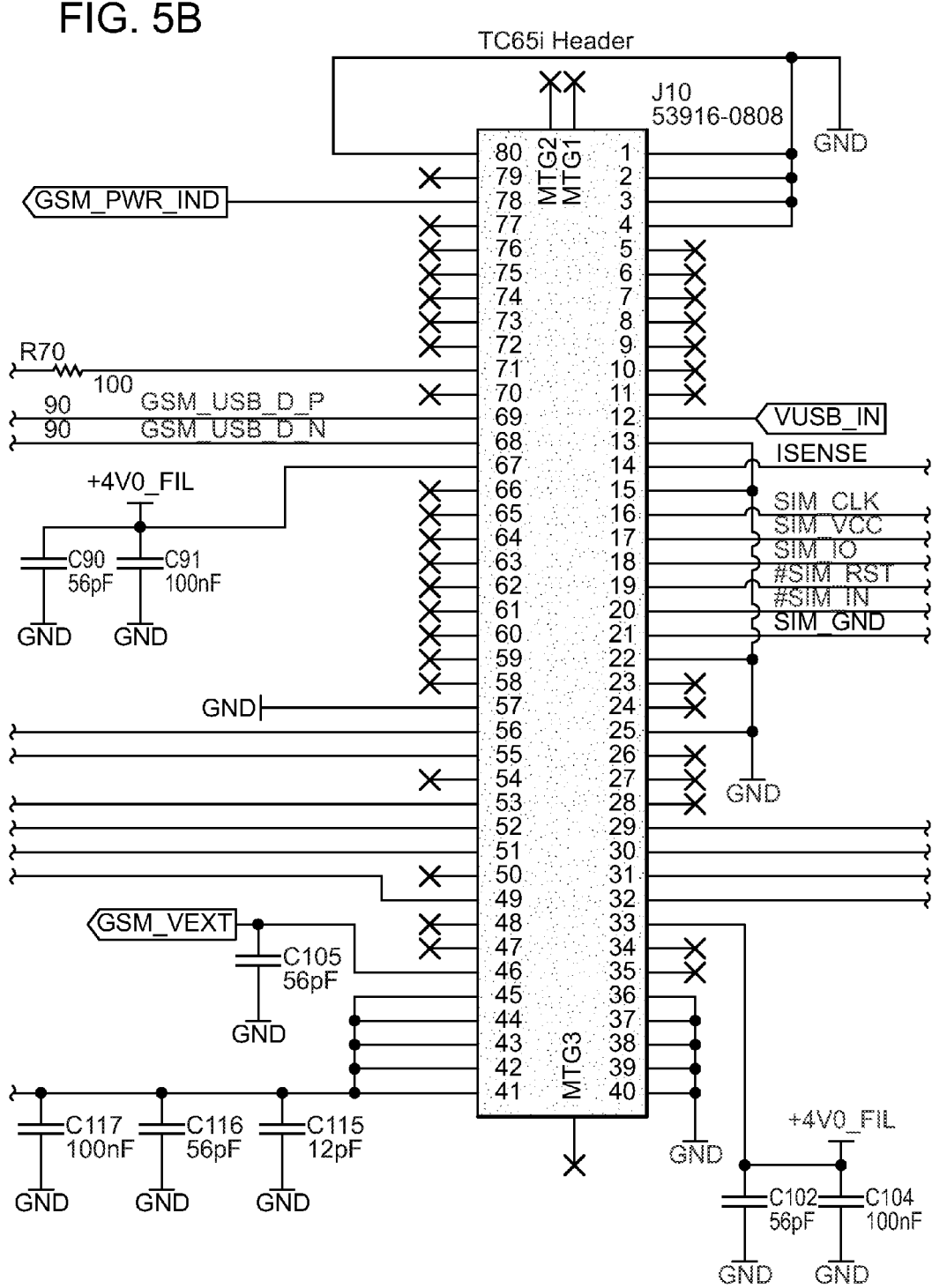
Figure 5C:
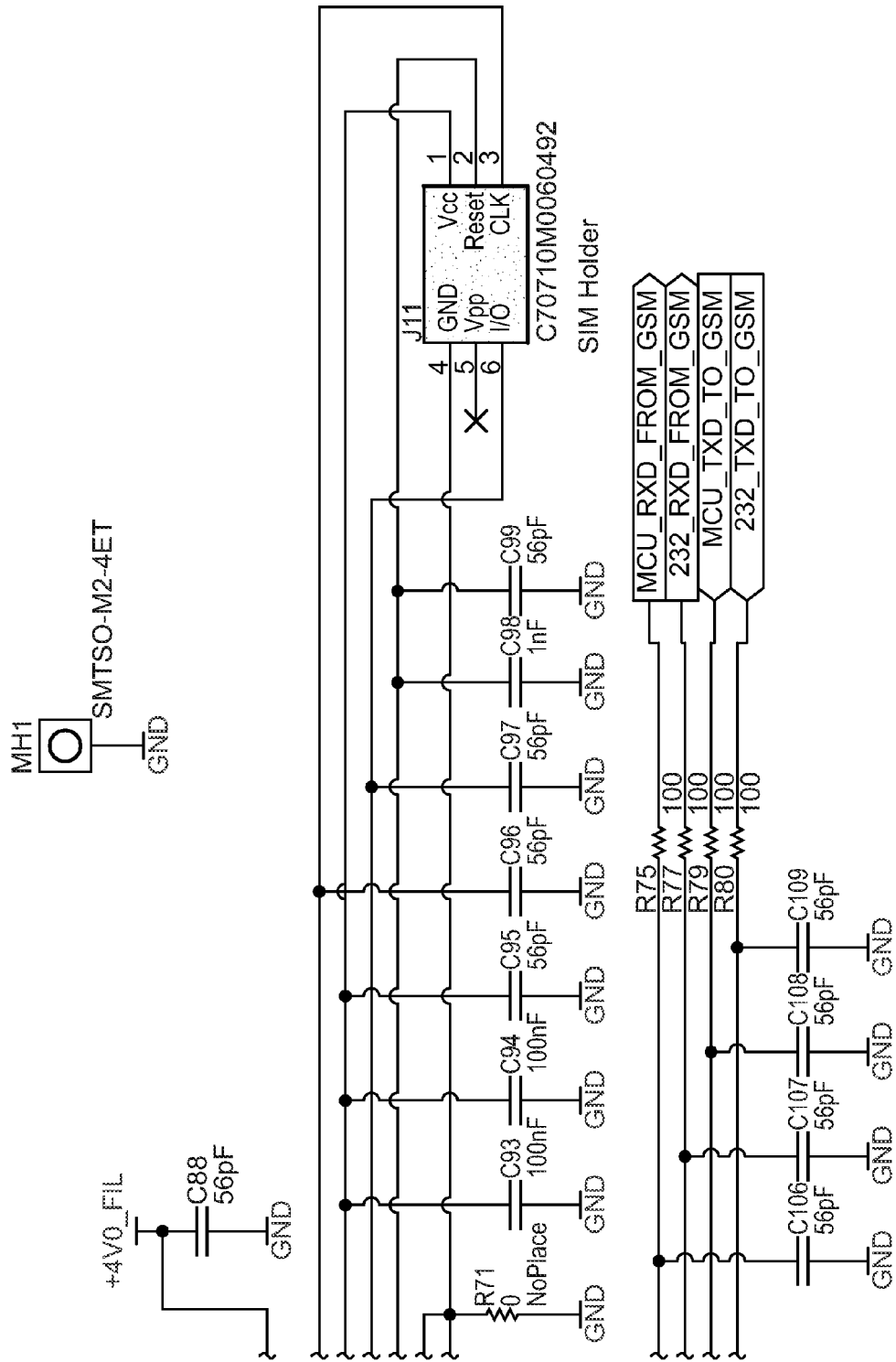
Figure 6:
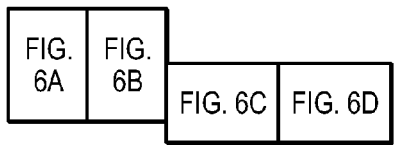
FIGS. 6A-6D are electronic schematic diagrams of the GPS module of the time and attendance device of the present invention.
Figure 6A:
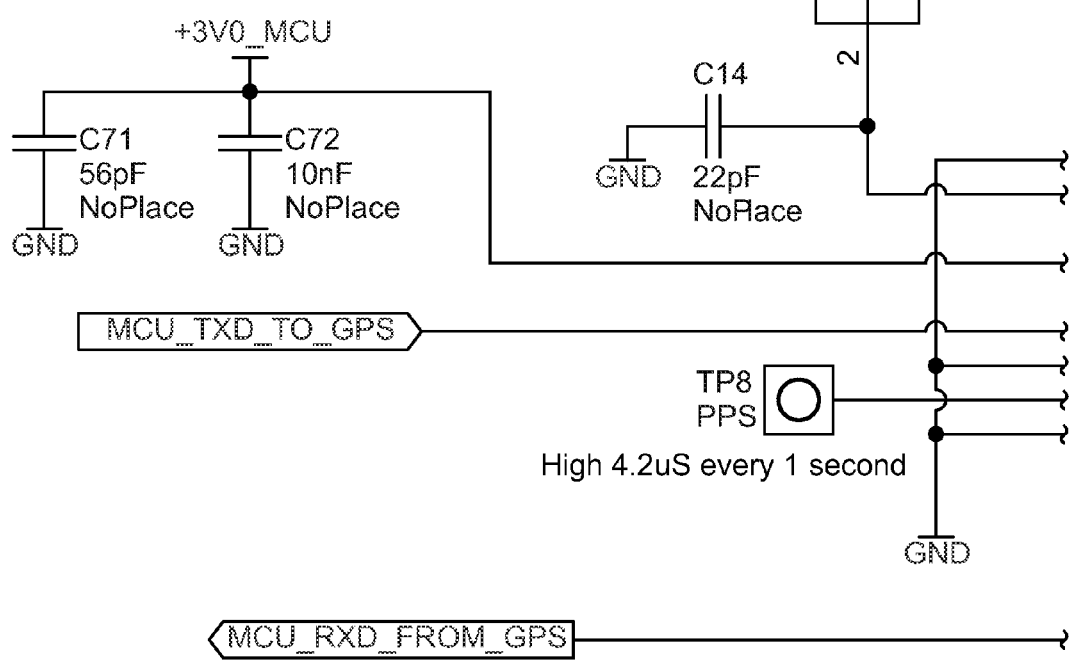
Figure 6B:
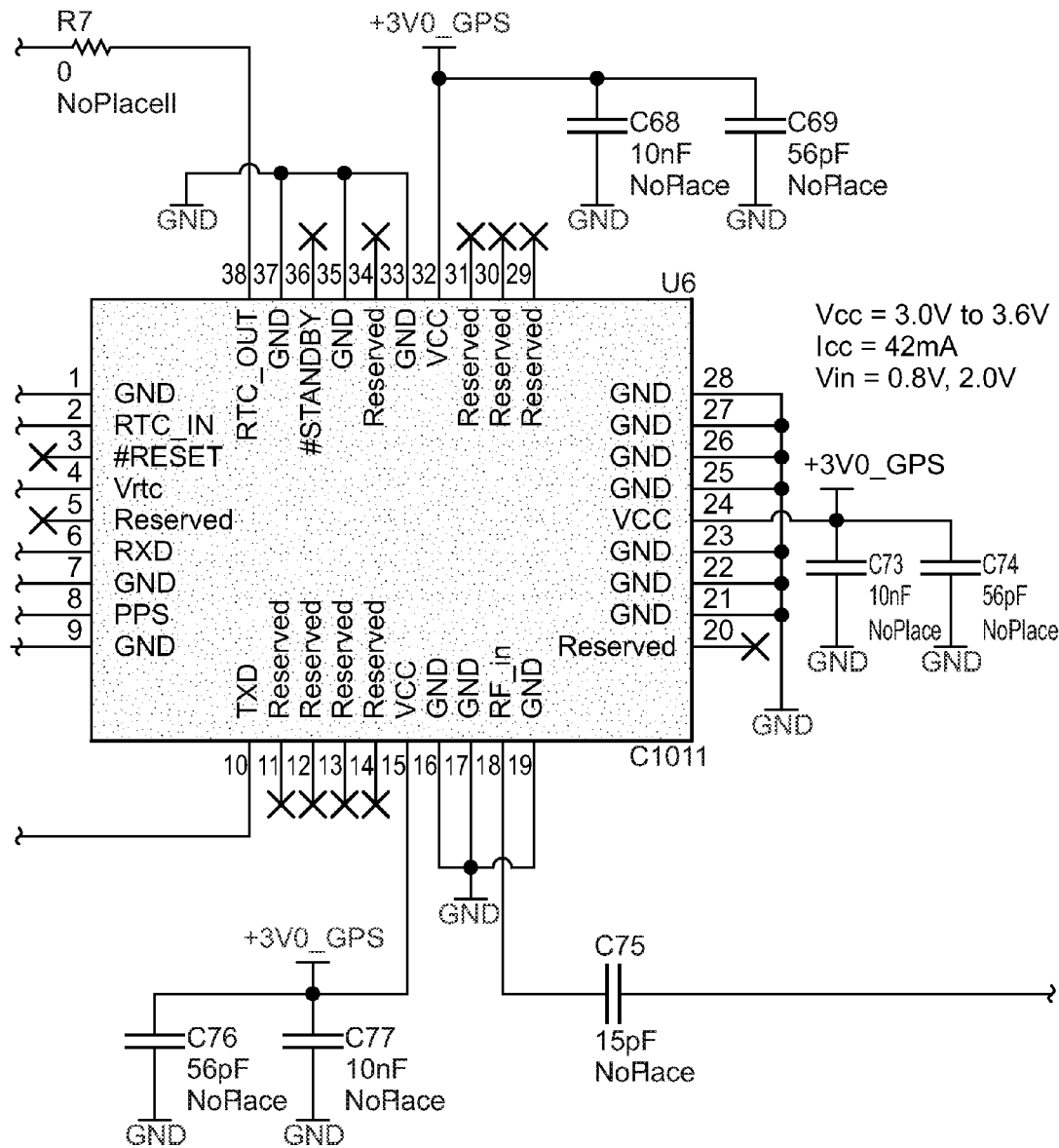
Figure 6C:
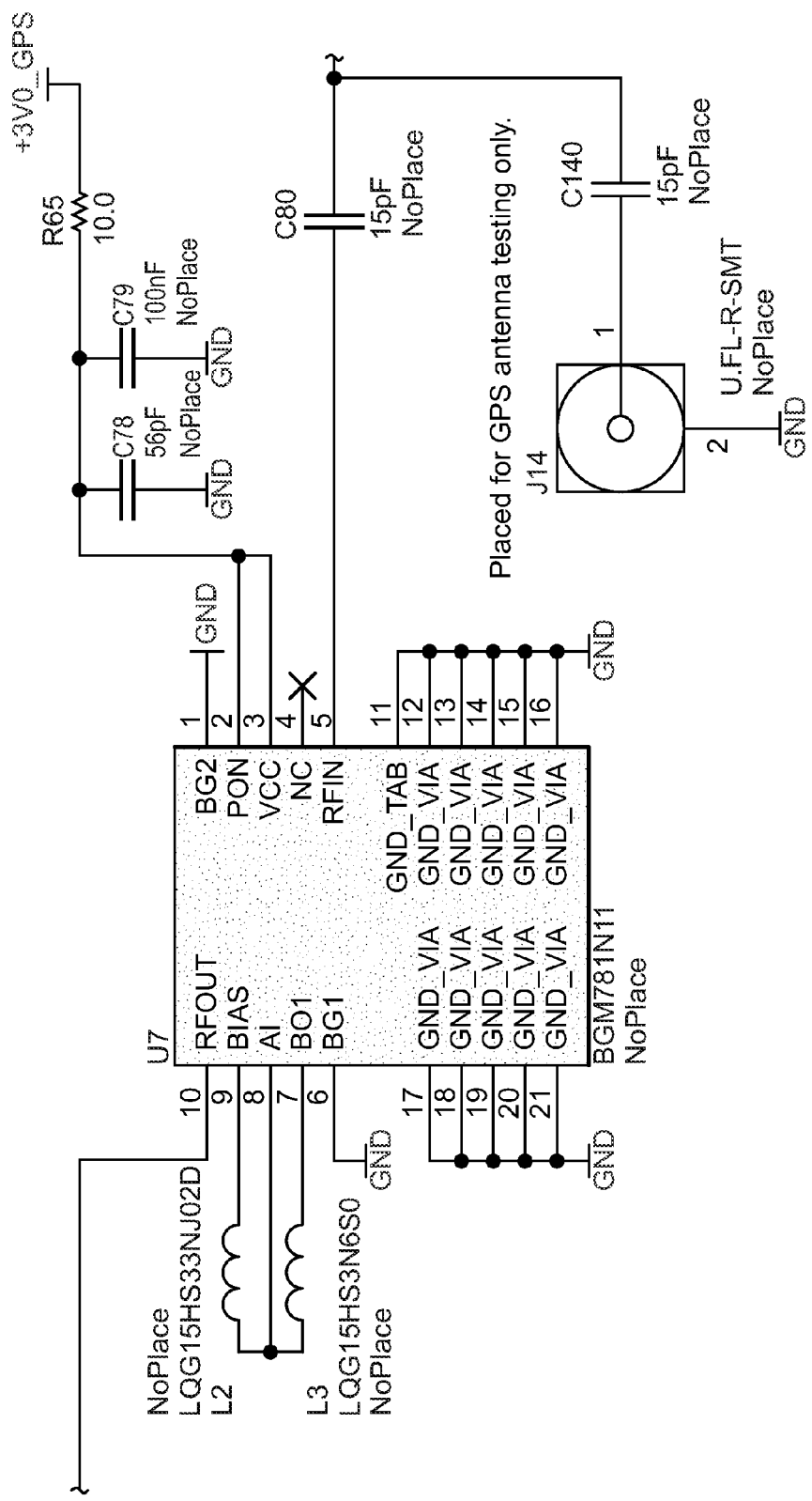
Figure 6D:
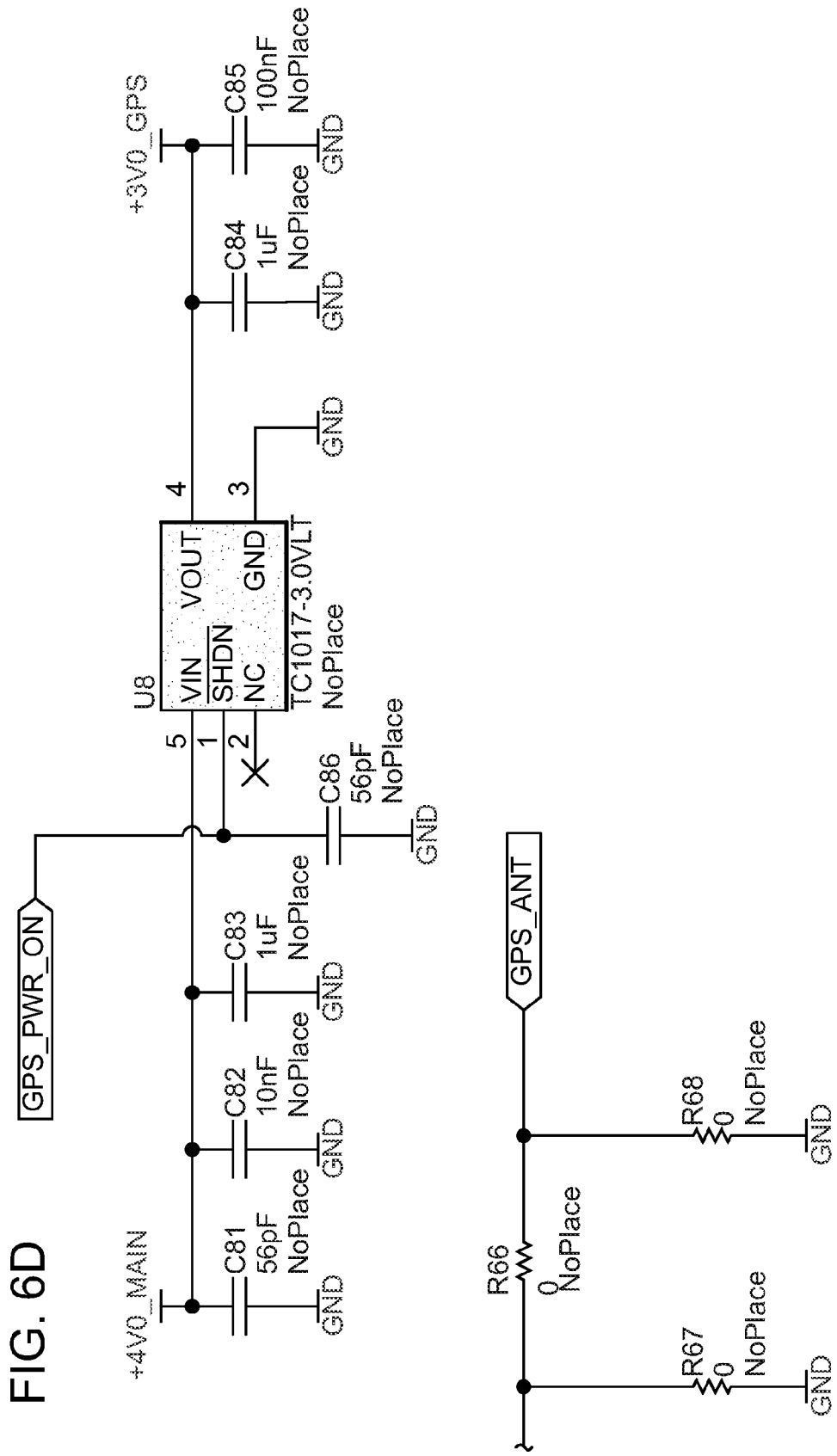
Figure 7A:
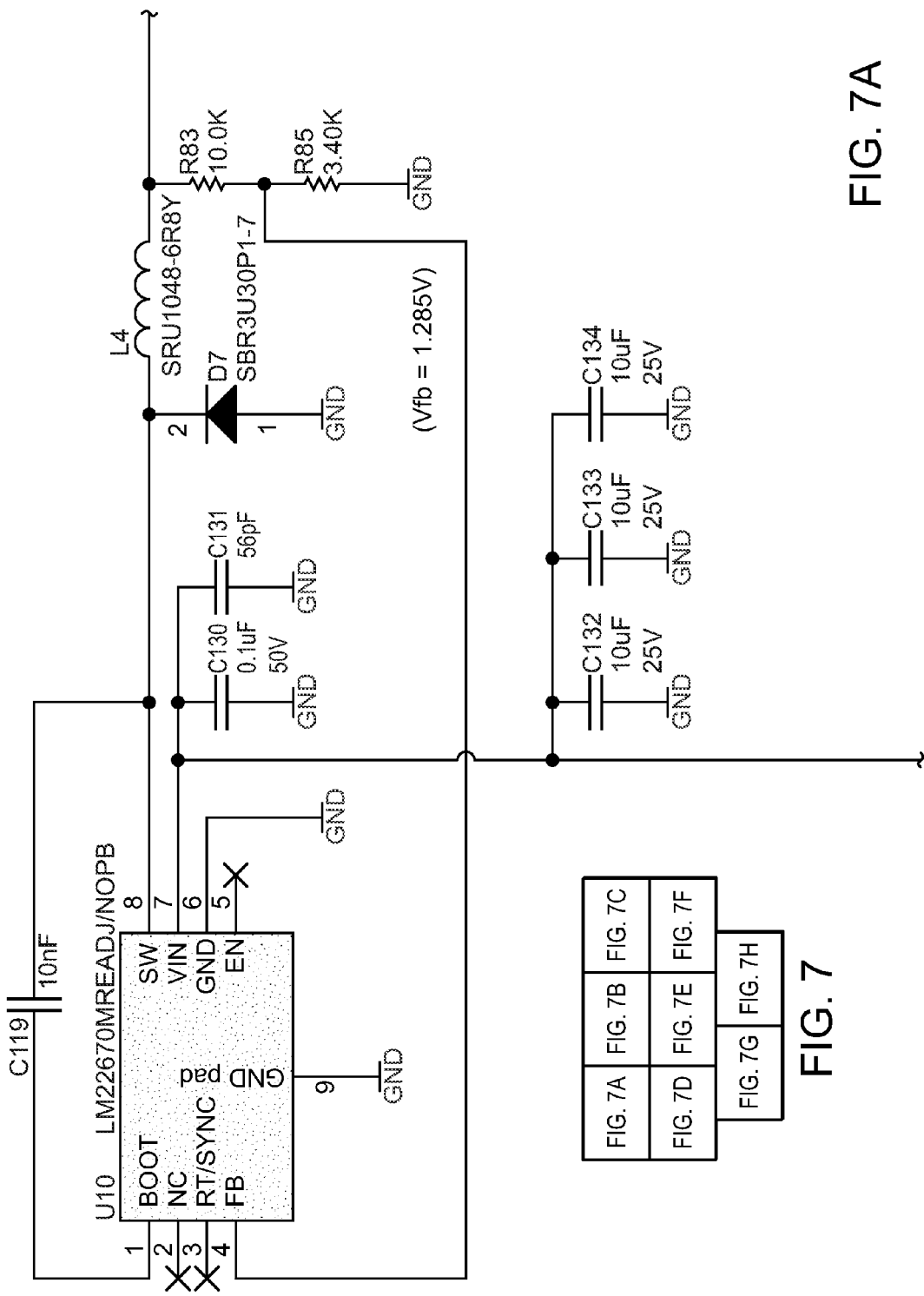
FIGS. 7A-7H are electronic schematic diagrams of the power module of the time and attendance device of the present invention.
Figure 7B:
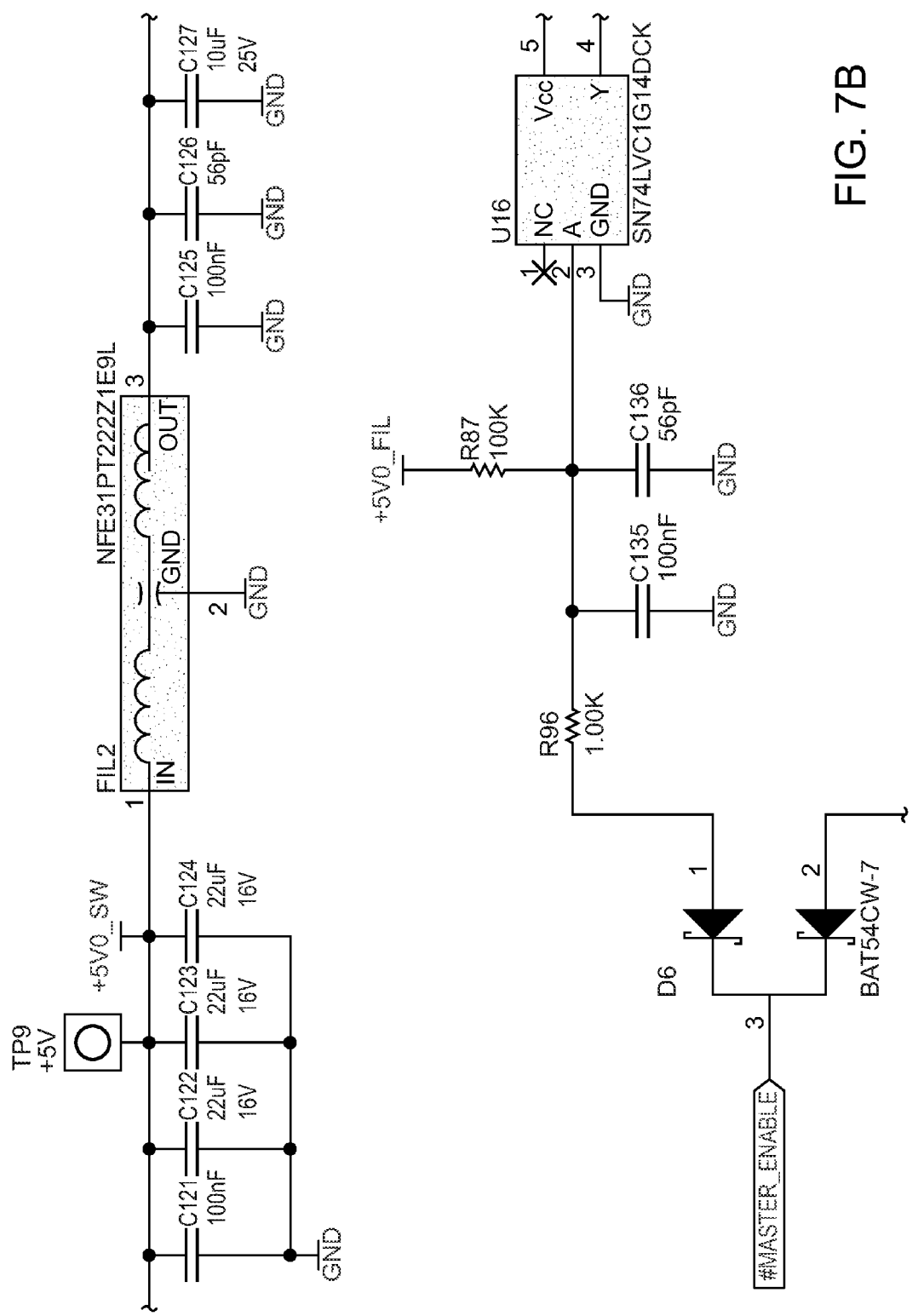
Figure 7C:
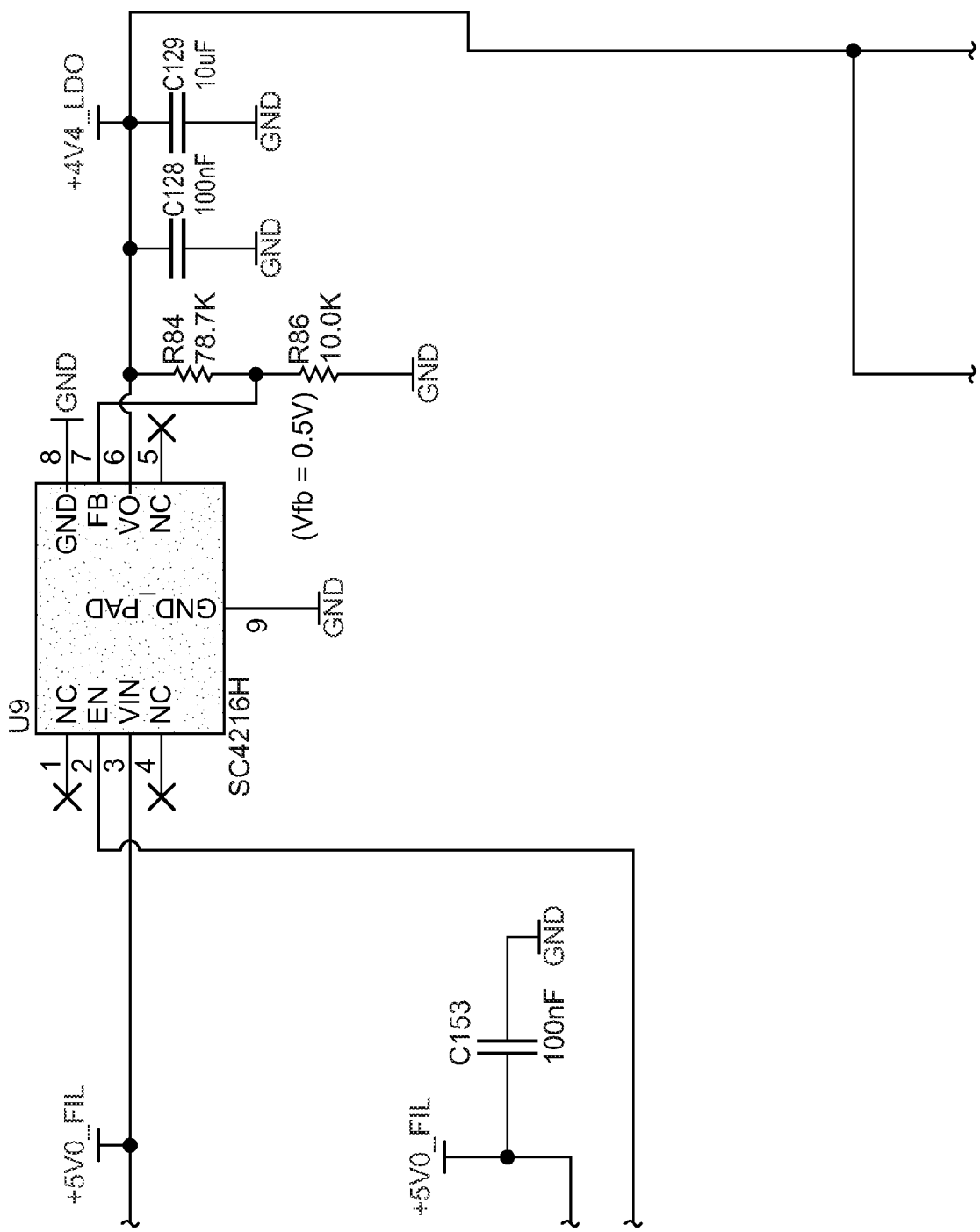
Figure 7D:
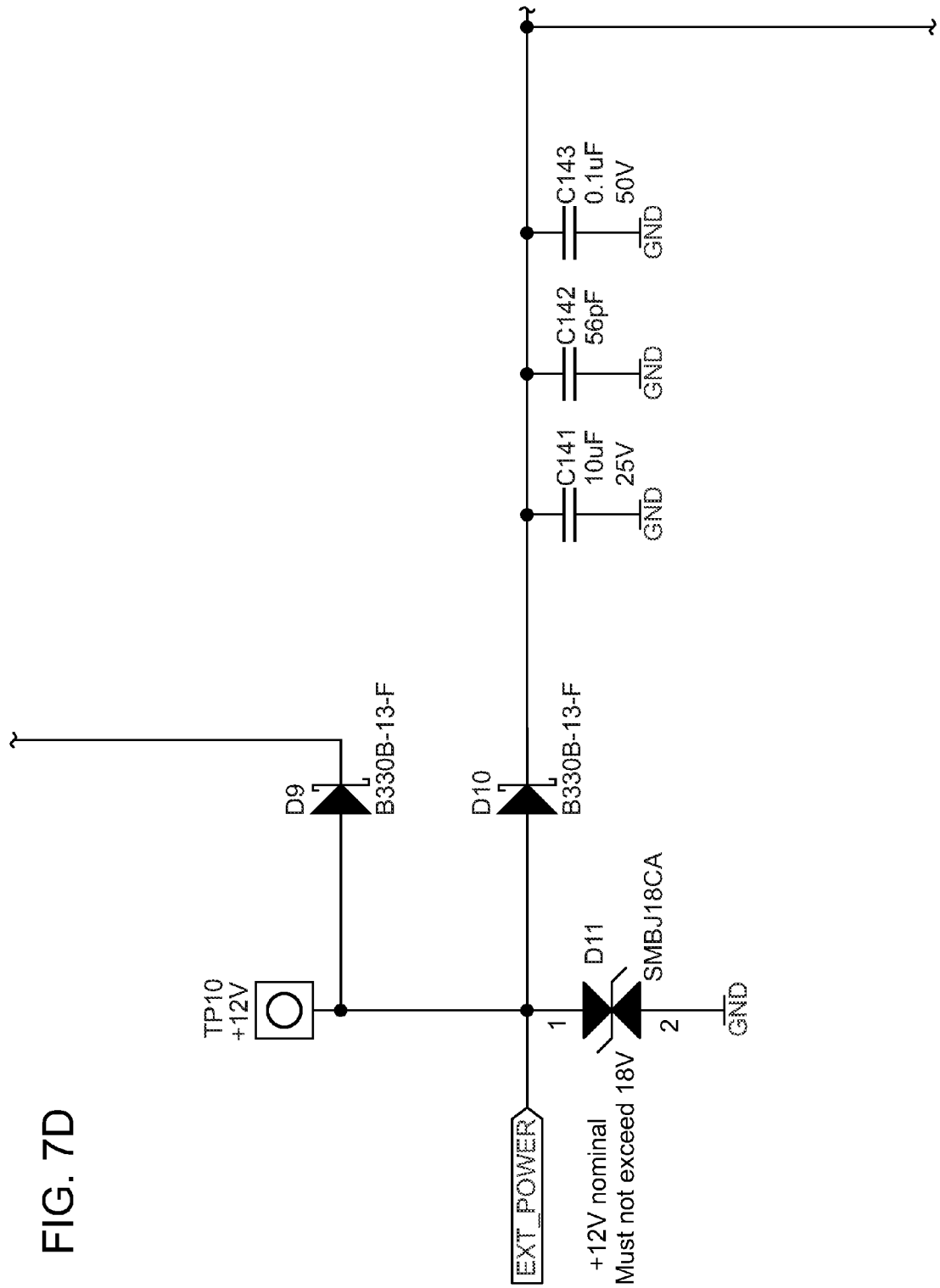
Figure 7E:
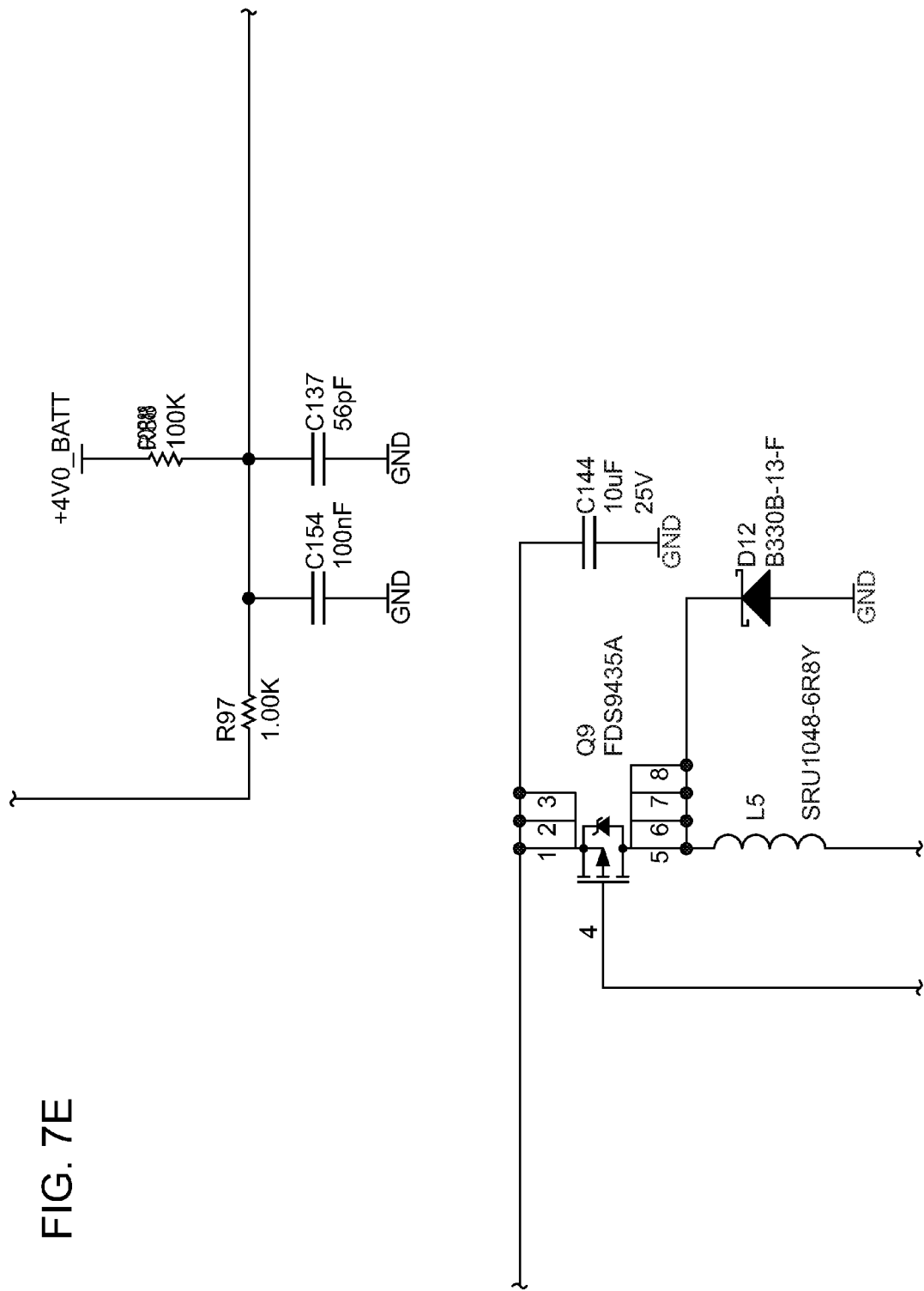
Figure 7F:
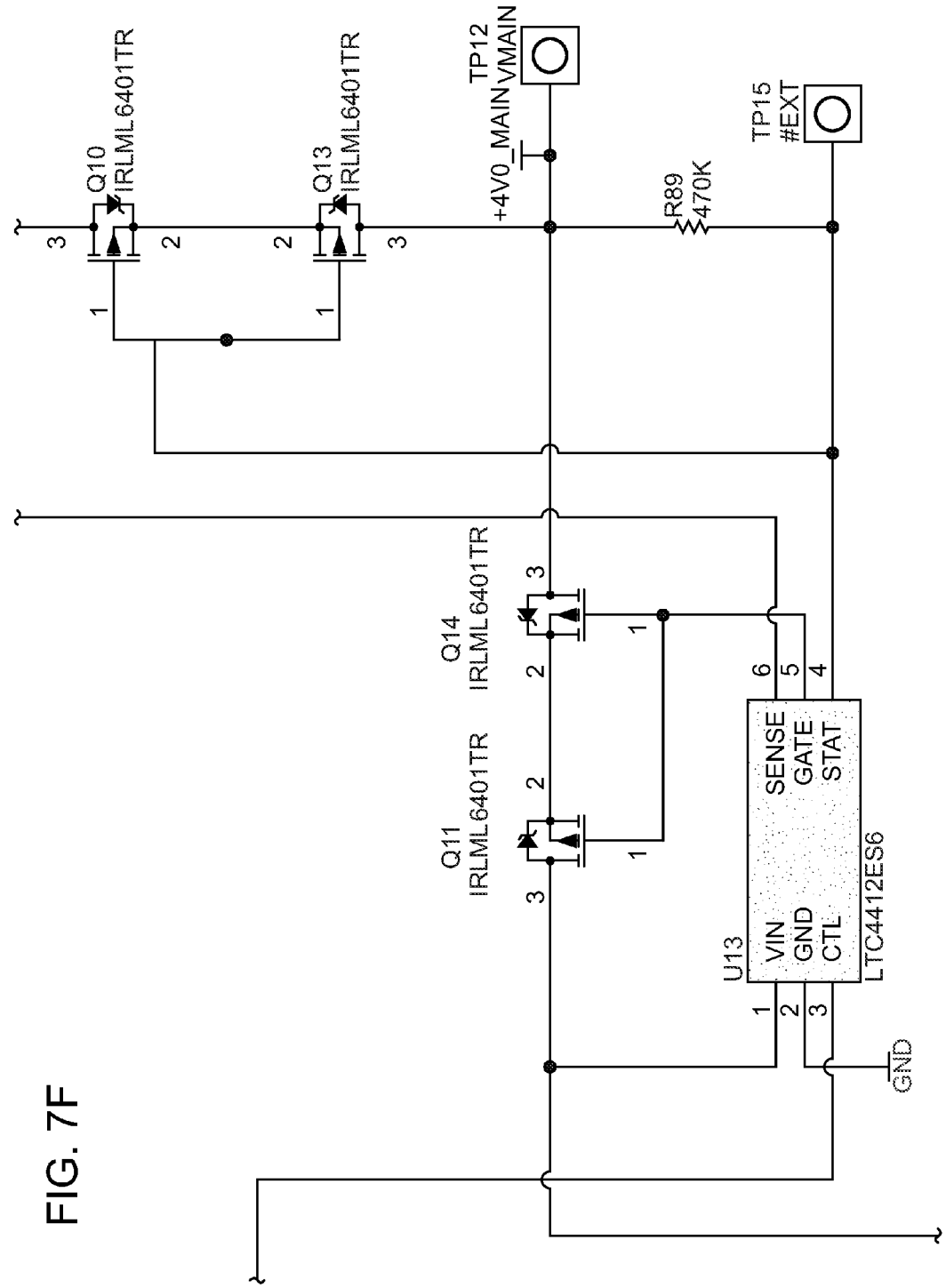
Figure 7G:
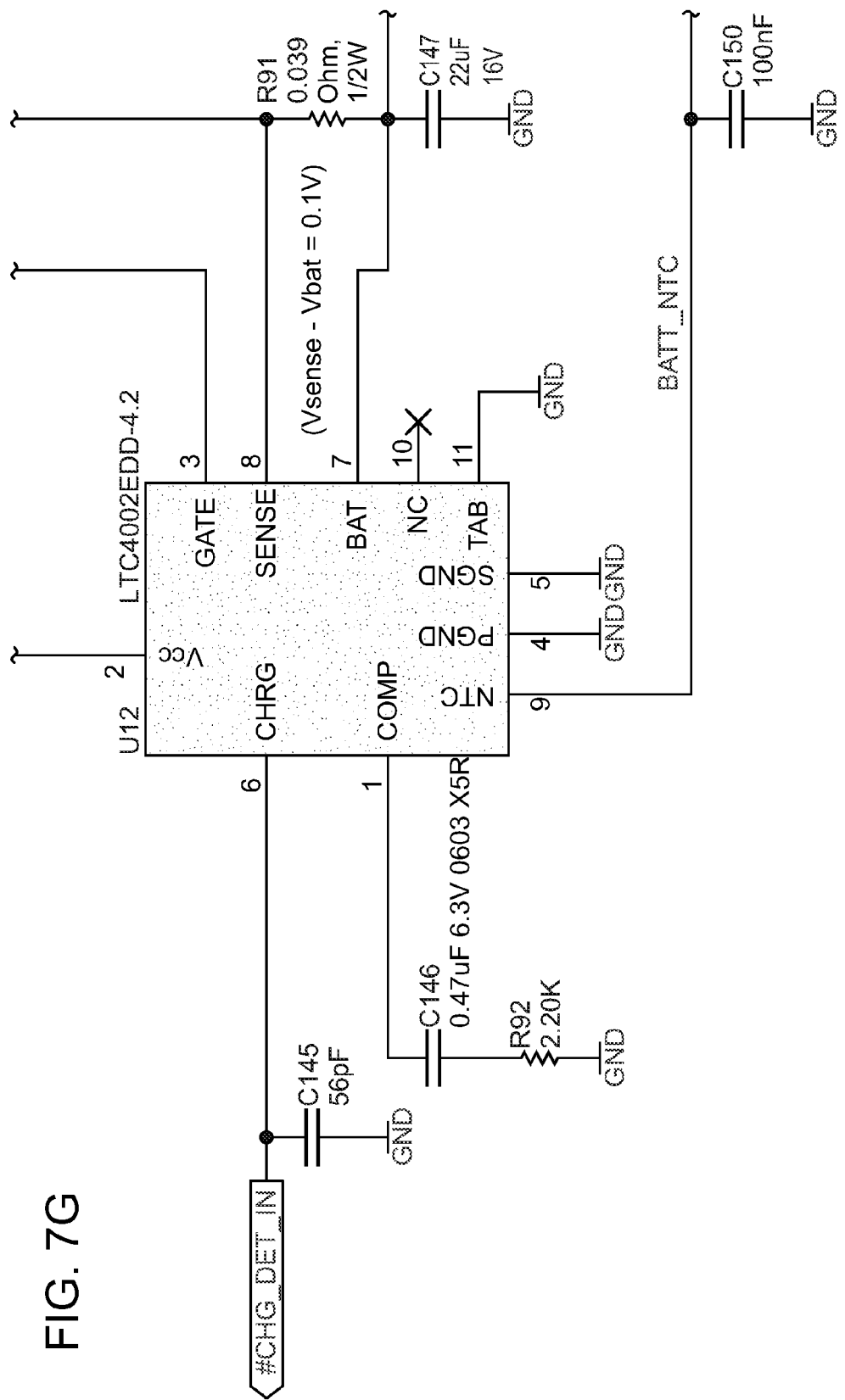
Figure 7H:
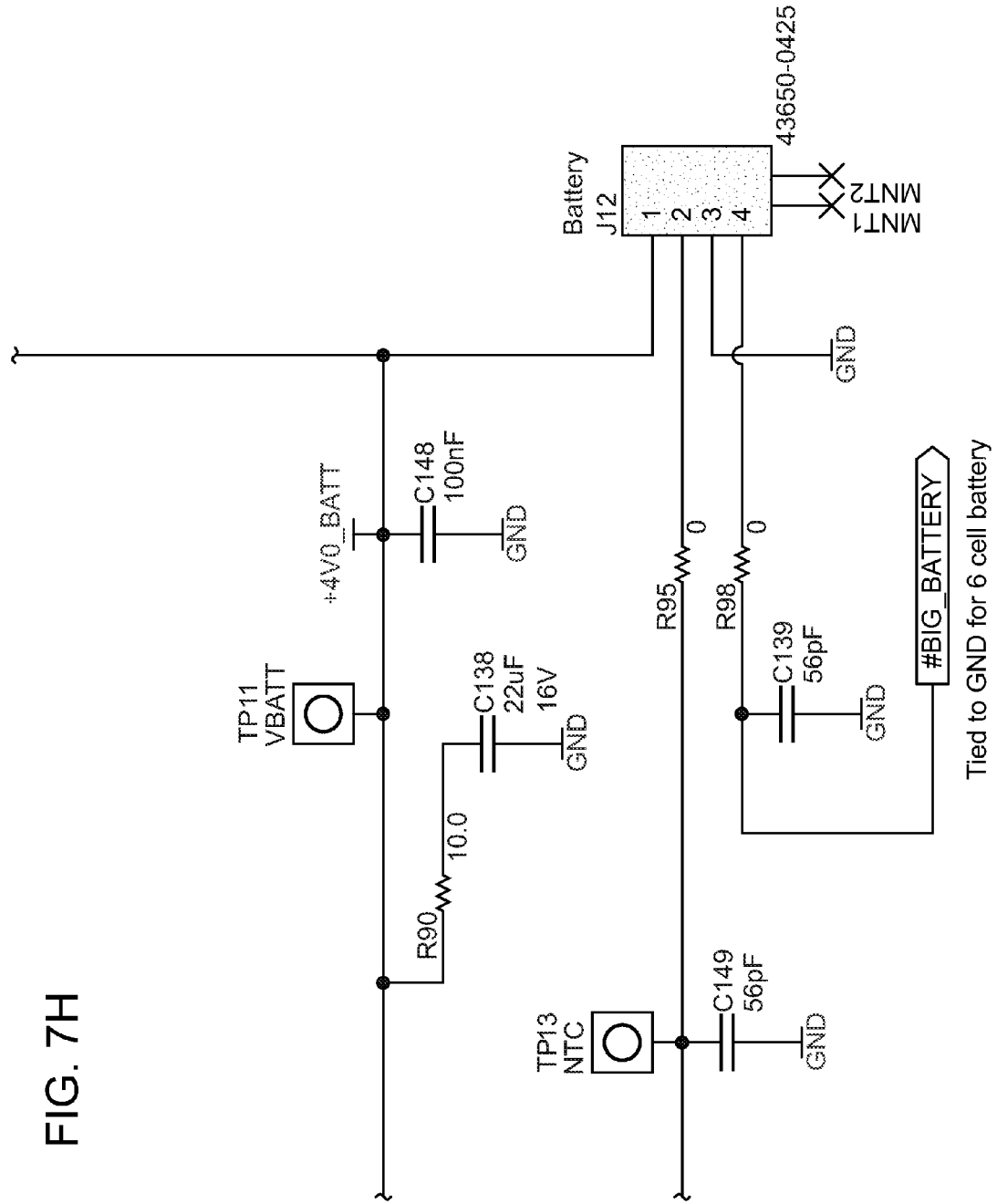

FIGS. 5A-5C are electronic schematic diagrams illustrating the communications module of the main unit 204, including the SIM card holder, as described above.

FIGS. 7A-7H are electronic schematic diagrams illustrating the power module 208-212 of the main unit 204 of the device 200.

It will be appreciated by those skilled in the art that the electronics schematics illustrated in FIGS. 3-7 are for exemplary and illustrative purposes of an embodiment of the invention, and can be modified as needed in order to attain the functionality and principles of the invention.

The main control unit or control board 206 of the main unit 204 is used to handle charging circuitry, power management, and control of the LEDs 216. Based upon the input state for the LED, the microcontroller 206 then sets the LED on, off, slow blinking or fast blinking, as will be more fully described herein. When the LED is blinking, the amount of time it is on and off is set to conserve battery power, in accordance with the present invention. Preferably, the system defaults to slower blinking which conserves more power than a fast blinking LED. The main control board also initializes and communicates with the GPS module. The embedded software communicates with the microcontroller to get the GPS NEMA string. The main control board also initializes the cellular modem and starts the embedded software of the communications module, and more particularly the controller 230. The main control board 206 also has a watch dog process that will detect if certain conditions exist, and in those cases reboot the cellular modem and restart the embedded software, as necessary. It will even reboot the microcontroller if needed. The main control board 206 has the connections for the In and Out from the cellular modem to the microcontroller, the time attendance clock, USB and all other IO ports the cellular modem supports. The main control board 206 also monitors battery voltage, the charging state, and any manual overrides. It also has the ability to receive remote firmware updates over the air, such as from the gateway service 300. Whenever possible, the microcontroller runs using very little power and allows the communications module, particularly the modem, to go into a very low power state or sleep mode and to be initiated and woken up at a prescribed time.

Periodically, as dictated by the design of the device 200 and/or the owner and user of the device 200, worker time and attendance data is collected and wirelessly sent via the wireless network 228 to the remote computer and/or gateway service 300, and then on to the customer's computer 400. Preferably, this is not done continuously, but according to a pre-established schedule so as to conserve battery power. For example, the device 200 can be configured such that every minute the device queries whether there are any new worker time and attendance data which has been received by the electronic time clock 220. It will be appreciated that this query can occur once a minute, once an hour, once a day, etc. The less frequent the occurrence of the query, the greater the battery conservation.

Typically, upon querying the electronic time clock for new worker time and attendance data, if there is any new time and attendance data the main unit 204 will retrieve that data and store it on its own memory 218. Then, according to a pre-established schedule, the new time and attendance data which has been accrued will be transmitted via the wireless network 228, such as the described cellular communications network. For example, the main unit 204 may query the electronic time clock to see if any new worker time and attendance data has been received and saved on its memory 224. If so, this is retrieved and placed upon the memory of the main unit 204.

However, in order to conserve battery power, this new worker time and attendance data is not necessarily sent at that time. Instead, the main unit 204 may query the electronic time clock multiple times, such as over the course of an hour, before transmitting the worker time and attendance data retrieved over the course of that hour. If no new worker time and attendance data has been received by the electronic time clock between the pre-established times for transmitting data, no data will be transmitted and no transmission will occur in order to conserve battery power. Thus, a transmission of data will only occur when new worker time and attendance data has been received by the electronic time clock and retrieved by the main unit 204. This will prevent the device 200 from unnecessarily powering the communications module and initiating a transmission when there is no new worker time and attendance data to be transmitted. Thus, for example, there may be a prolonged time period, such as between six p.m. and seven a.m., when no workers will clock in or clock out, and thus the device 200 will not transmit during this time period in order to conserve battery power. Typically, however, the main unit 204, such as the controller 230, will periodically query the electronic time clock 220 to see if any new worker time and attendance data has been received according to the pre-established schedule. Otherwise, all systems that are not needed are placed into a sleep mode or low battery usage state in order to conserve battery power.

The device's primary battery 210 is preferably a rechargeable battery, such as a lithium ion battery, that powers the device 200. In accordance with the battery conservation measures taken by the invention, the battery is estimated to last approximately thirty days of normal device usage. If the typical pay period is every week or two weeks, the device 200 will be capable of operating and functioning according to normal usage for anywhere from two to four pay periods without requiring recharging or any other maintenance.

As described above, in the event that the primary battery 210 is discharged or of a very low charge, the battery 226 of the electronic time clock 220 can serve as a backup source of power for the electronic time clock so that the clock 220 can continue to receive and record worker time and attendance data. The secondary battery 226 may also be used to power a visual and/or audio notification or confirmation that the time punch has been received. The time and attendance data remains safely stored on the device 200 until the main battery 210 is recharged, outside power supplied through the AC adapter 212, or until the data is collected using an infrared or Bluetooth collector device or the like.

Workers can continue to clock in and clock out as the electronic time clock 220 portion of the device 200 can operate without the main battery 210 or AC adapter 212 for several weeks or months. This is important as the device 200 of the present invention is often used in workplace situations such as construction sites where reliable alternating current power is not readily or consistently available at all or for prolonged periods of time. For example, when a construction site is first graded, the foundations laid and the building framed, there may not be a reliable source of AC power available to the device 200. Thus, the batteries 210 and 226 are incorporated into the device 200 and the device is designed and configured to last several weeks, up to even several months, before the need for recharging or replacement.

With reference again to FIG. 2, the device 200 includes a depressible button 236, referred to as a manager button, which when pressed and released will act as a manual override and send worker time and attendance data to the remote computer/gateway 300 via the wireless communications network. However, the device 200 will not go through the transmission process if the outbox is empty of any new time and attendance data. The external manager button 236, which can be placed at the rear of the device 200 so as not to be accidentally depressed, can also be depressed for a predetermined period of time to start or restart the device 200. Upon startup, an LED sequence will begin, as controlled by the indicator control 214 of the main unit 204. If there is data in the outbox, it will be sent after the restart is complete.

The LEDs 216, as illustrated in FIGS. 1 and 2, visually indicate various states and functionality of the device 200. In one embodiment, the first LED is a red/green LED, indicating charging and power status. A slow blinking green light is used to indicate that the device 200 is using battery power and is in normal operation. A solid green light indicates that the battery is fully charged and the device 200 is plugged in to an AC source. An alternating blinking green/red indicates that the primary battery 210 is low. Typically, this will be able to be viewed for a prolonged period of time, such as a few days. A fast blinking red light indicates that the battery is too low to connect to the cellular network. A solid red LED illumination indicates that the battery is charging.

The second LED 216 is an alert or warning LED, and typically red. A slow blinking red light indicates that the clock is not connected to the wireless network, or was not able to sync or otherwise had trouble transmitting on the last attempt.

The next light, referred to as the "outbox" light in FIG. 1 is typically a yellow LED. When slowly blinking, it indicates that there is data that needs to be transmitted. When blinking at a faster rate, this indicates to the user that the data is currently being transmitted.

The fourth LED 216 illustrated in FIG. 1, the "signal" LED is typically a white LED and blinks if the device 200 has a strong enough signal to send data. It does not blink if there is no signal, that is, the device 200 is unable to connect to a wireless network, such as the preferred cellular network.

Time and attendance data and records will not be sent from the device 200 in such a state. Other combination of light patterns can be used to notify the user of various device status 200, functions, etc.

With reference again to FIG. 2, the housing case 202 is comprised of a rugged ABS housing which is of a lightweight build and design, but which is ruggedized so as to be used in virtually any workplace, including outdoor construction sites and the like. The device 200 is capable of withstanding direct sunlight, high temperatures into the hundreds, low temperatures below freezing, and is waterproof. The device 200 can be left outdoors while it is running on internal battery power. Typically, however, if the AC adapter is being used to provide power, the device 200 is used indoors and not exposed to water. Otherwise, the device 200 is waterproof and weatherproof.

The device's rugged ABS case housing and lightweight build is designed to track time and attendance anywhere, saving trips to and from worksites. Its portability is ideal for contractors, school facilities, property managers and other employers which need to track employee's work time remotely. The build and design of the device 200 allows it to be put anywhere, whether it be in the rain, snow, desk, high temperatures, low temperatures, etc. It is comprised of a rugged, anti-shock, military-grade ABS plastic case. It can operate from a negative ten degrees Fahrenheit to one hundred seventy degrees Fahrenheit, and when using battery power is waterproof.

In the illustrated embodiment, the device 200 includes a handle 238, which can be used to carry the device 200 from worksite to worksite, or within different places to clock in and clock out within the worksite. The handle 238 can also be used to hang the device 200 from a hook or other projection at the worksite. The device 200 may have holes, apertures or recesses into which can be placed heads of nails, screws, etc. for holding the device 200 upon a wall, board, etc. It is also contemplated that the device 200 can be mated with a holding plate, which would be attached to a board, wall, etc. so as to more securely hold the device 200 in place.

The device 200 of the present invention is "provisioned" for each user. Provisioning refers to the steps needed to assign the device to a particular customer, allowing it to send data to that customer's computer and the related time attendance software which the user utilizes. This includes providing the SIM card 234 in the device 200 and associating that SIM card with the device 200 and the customer. This enables the gateway service 300 as well as the customer's computer 400 to recognize and be able to communicate with the device 200, by receiving periodic wireless data downloads.

Figure 8:
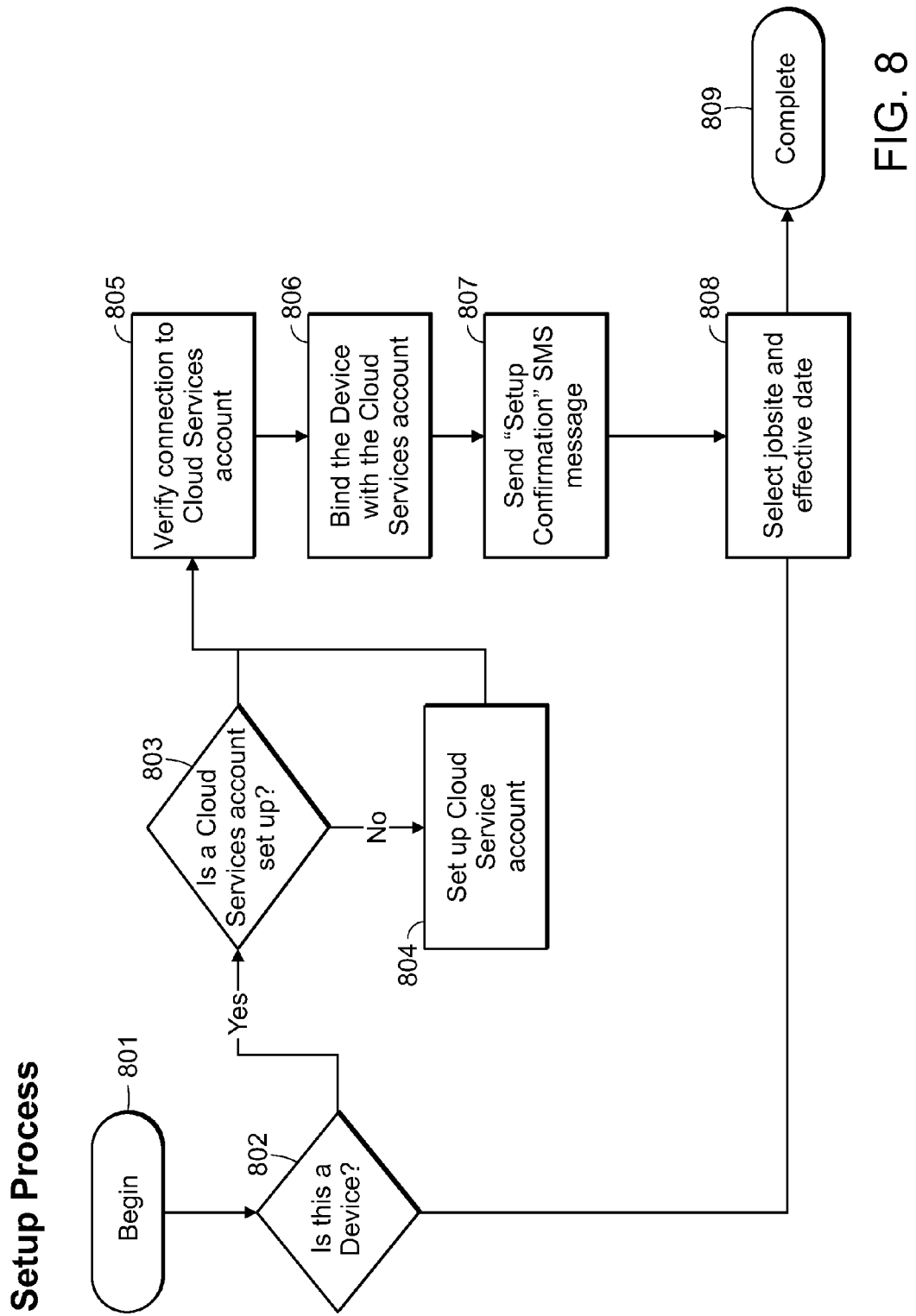
FIG. 8 is a flow chart illustrating the steps taken in accordance with a setup process, in accordance with the present invention.

With reference now to FIG. 8, the steps taken in a typical setup process are shown. The process begins 801 with the query as to whether this is a device 802 of the present invention. If so, the system queries if the cloud service's gateway account has been set up 803. If not, a cloud services account is set up 804 for the customer. Once the customer has a cloud services/gateway account set up, connection to the cloud services/gateway account is verified 805. The device is then bound with the cloud services account 806, and a "setup confirmation" SMS message is sent 807. The jobsite and effective date are selected 808, and the setup process is completed 809.

After the device 200 is provisioned, during the startup sequence, the device performs housekeeping and internal consistency checks. It initializes the GSM network connections and acquires the GSM network date and time. It also sets the local device date and time, such as using the GPS module. It also informs the gateway 300 that it has been started and/or rebooted. When the startup is complete, the device sounds an audio alert informing the users on the site that the device 200 is ready to use. It also scrolls through the signal, outbox, alert and power LEDs 216 rapidly, such as three times, to provide a visual indication that it is ready for use. It then sends the contents, if any, of the outbox which constitute worker time and attendance data time stamp punches and record data which have not been previously sent.

Virtually zero configuration is required for the device 200. All configuration is handled over the air, which permits initial setup and deployment to take under one minute per device 200. The device 200 operates on extremely low power, sending thousands of records and lasting more than a month with typical usage. As indicated above, the data is sent automatically at specified, pre-established intervals. The default configuration is to send data every hour, if there is data to be sent. This is customizable down to the minute. Of course, as described above, the "manager button", when pressed, forces the device 200 to send immediately, rather than waiting for the specified interval.

With reference now to FIGS. 9A-9H, flow charts are illustrated describing the steps taken during startup and main processing of the device 200. The device is powered on 901. This powers the microcontroller that is on the device main board. This is a low power processor that drives the LEDs, GPS module, charging circuits, cellular chip, and other peripherals. When the microcontroller is turned on, it sets the Alert LED 216 into fast blink 902. This is the only LED turned on. This is an indication that the main board 206 has power and the microcontroller is running.

The microcontroller then starts the embedded application 903, wherein the microcontroller turns on the cellular modem and sends an AT command to start the embedded application. The embedded application opens a serial connection with the microcontroller 904. This is used to obtain the state of the microcontroller and to send commands to the microcontroller. The microcontroller's state includes the state of each LED, battery voltage, AC connection, external button press, and others. The embedded application sends commands to the microcontroller like turn on Alert LED off, give GPS NMEA (National Marine Electronics Association) string, and others.

The device then gets the RESET code 905 from the microcontroller. This indicates why the device was reset, if it was reset. This could be for a number of reasons, including the microcontroller or cellular modem restarting for an unknown reason, the power switch being turned on, the reset pin on the microcontroller being pulled to ground, the microcontroller watch dog process rebooting the microcontroller, the cellular modem sending a reset command to the microcontroller, the microcontroller having not received a command from the embedded application for a predetermined period of time when not in sleep mode, the microcontroller determining that the embedded application is no longer responding, the microcontroller receiving a debug command, over-the-air firmware update requests, including a reboot request, or over-the-air firmware update has failed. The LEDs are then scrolled 906, typically one at a time during the startup sequence. By only having one LED light on at a time, power usage is kept to a minimum.

Figure 9:
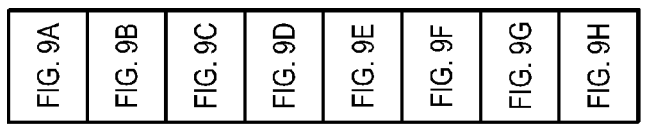
FIGS. 9A-9H are flow charts illustrating the steps taken in conjunction with the startup and main processing steps taken in accordance with the present invention.
Figure 9A:
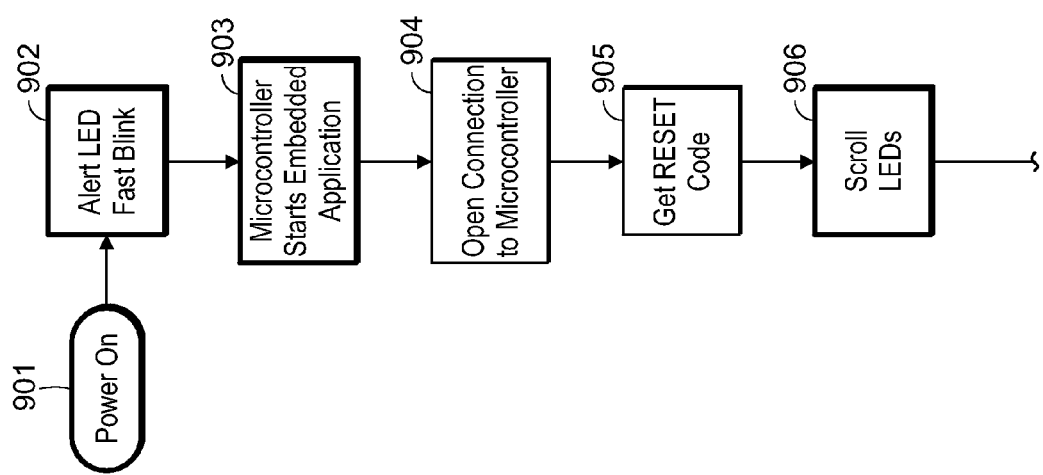
Figure 9B:
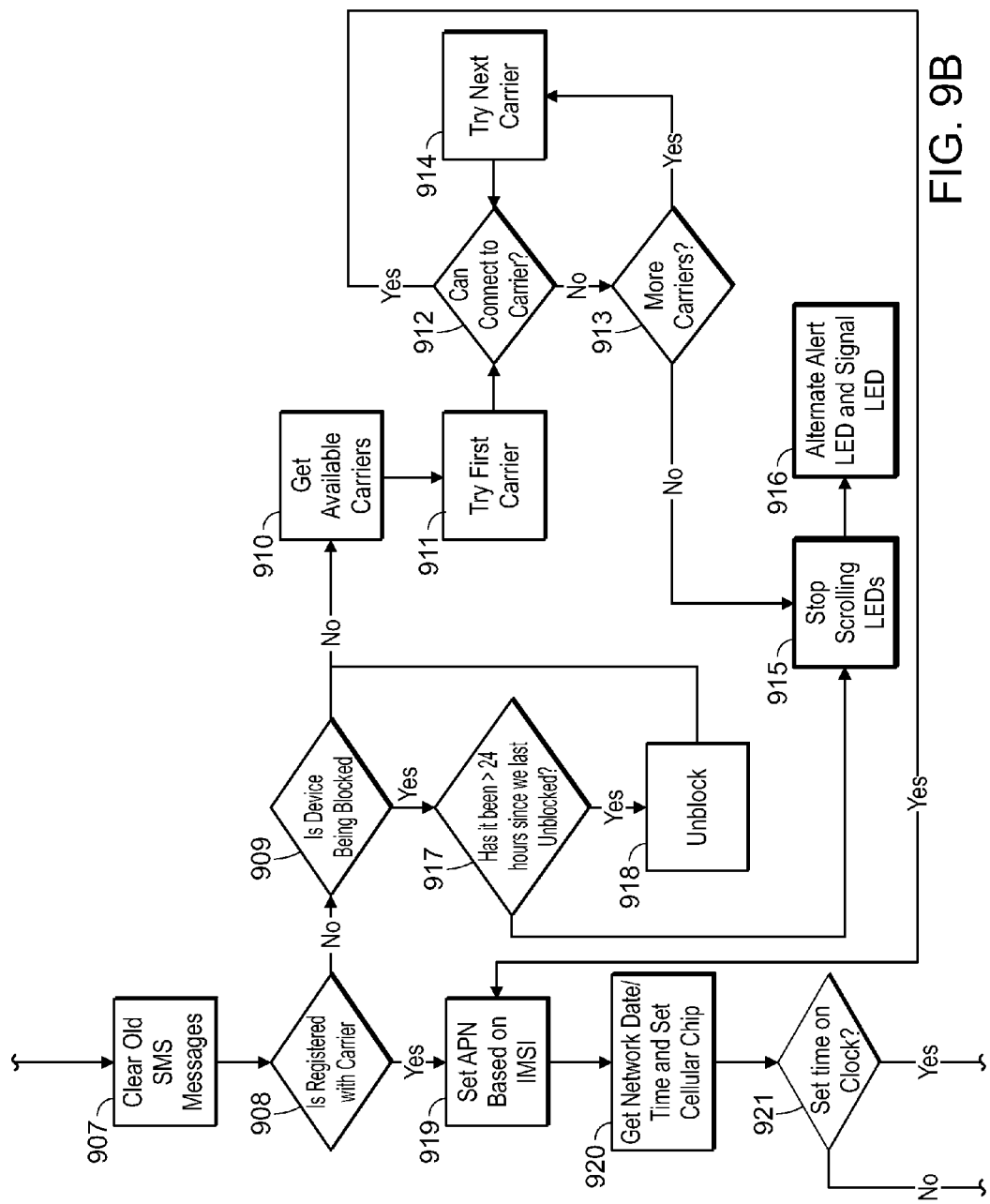

With reference now to FIG. 9B, old SMS messages are cleared and removed from the device so that the device starts in a clean state 907. The system then checks to see if the device 200 is automatically registered with a cellular carrier 908. If not, the system checks to see if the device shows that it is being blocked by a carrier 909. If not, a list of carriers is obtained that are currently available in the area 910. For example, this could return T-Mobile and AT&T. The system then tries to connect to the first carrier 911 to which the device is registered. For example, the device may attempt to connect to the AT&T network. The system then determines whether it can connect to that first carrier 912. If not, the system determines if there are additional registered carriers 913 which can be attempted. If so, the next carrier or wireless network system is attempted 914. If the device 200 cannot connect to a wireless network carrier, the startup sequence is aborted and the scrolling LEDs is stopped 915, and an alternate Alert LED and Signal LED are illuminated 916 to inform the user of the device of the status. This informs the user that the device has had a failure to register and connect with a wireless network carrier.

If the device was determined as being blocked, the system queries whether it has been at least twenty-four hours since it has been unblocked 917. If it has been greater than twenty-four hours, then the system attempts to unblock the device 918 so as to begin the process of obtaining available carriers, and trying the first and second carrier to connect to a wireless network carrier, as described above.

If the system determines that the device is registered with a carrier, or the device has been connected with the wireless network carrier, as described above, the Access Point Name (APN) is set based on the International Mobile Subscriber Identity (IMSI) of the SIM card installed 919. This allows one code base to support U.S. and Canadian carriers without user input. The network date and time are obtained and the cellular chip is set 920. This is obtained from the wireless network tower that the device is registered with.

Figure 9C:
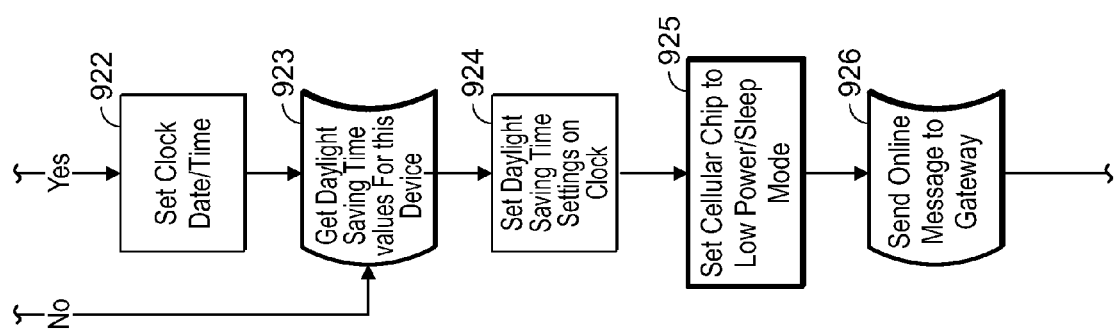

The system then determines whether the device has the setting to block it from changing the date/time on the device 921. Referring now to FIG. 9C, if the time can be set, the date and time is set on the clock device 922. After this step, or if the time cannot be set, the daylight saving time values for the device are obtained 923. By default, all the devices set the date and time on the electronic time clock upon startup. The daylight saving time values are made via a web service call to the gateway to request the daylight saving time settings for the device. The settings could be different for each customer. For example, a customer could decide not to follow daylight saving time and in turn the device will not follow the daylight saving time. However, if the customer decides to use the daylight saving time settings, the daylight saving time settings are set on the clock 924. Preferably, the electronic time clock 222 has daylight saving time capabilities and can handle daylight saving time changes, which helps reduce power usage by not having the embedded software continuously check to see if daylight saving time has changed and then set the electronic time clock. This allows for the electronic time clock to always be at the correct time and not have to wait for the device to set it.

The cellular chip is then set to the low power/sleep mode 925. When the embedded software is idle, the cellular chip will go into a low power state. A message is sent online to the gateway 926. This comprises a web service call to the gateway 300 with a message stating that the device is now online. The message includes some information about the device, including the date/time of the device, firmware and software versions, signal strength, and other data.

Figure 9D:
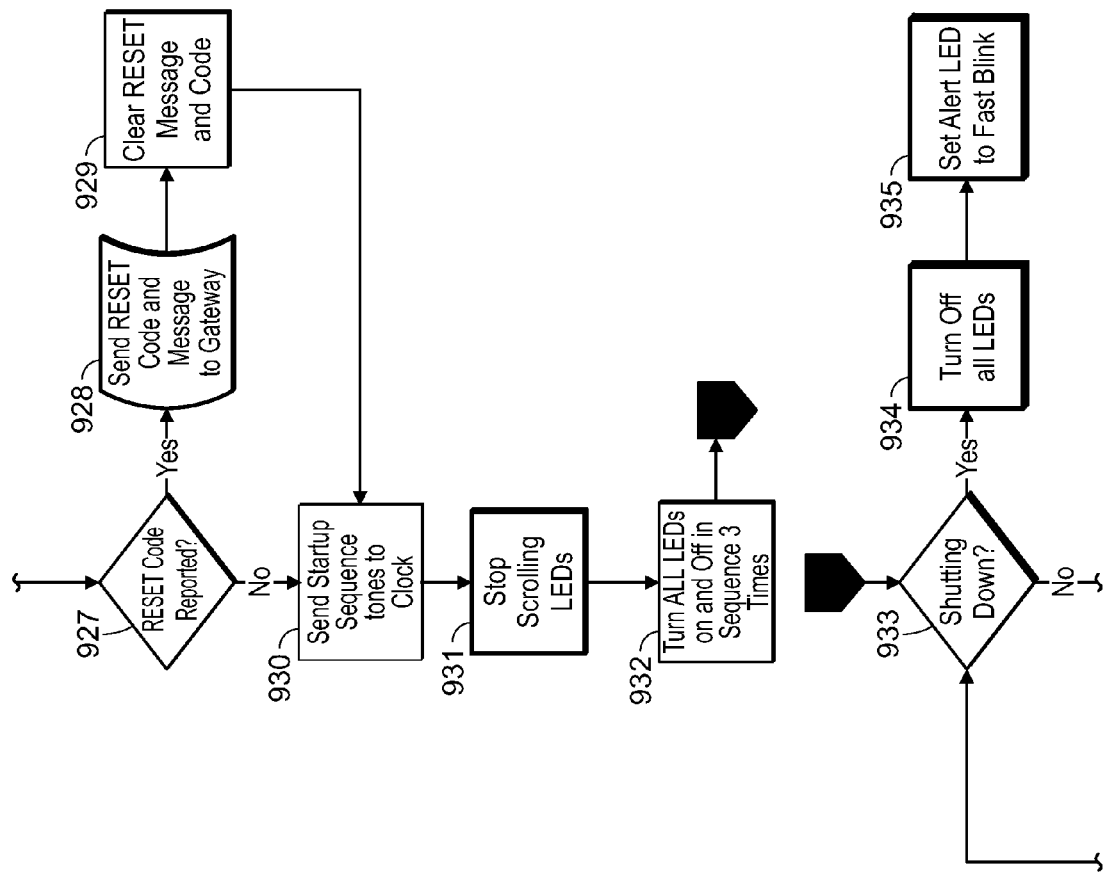
Figure 9E:
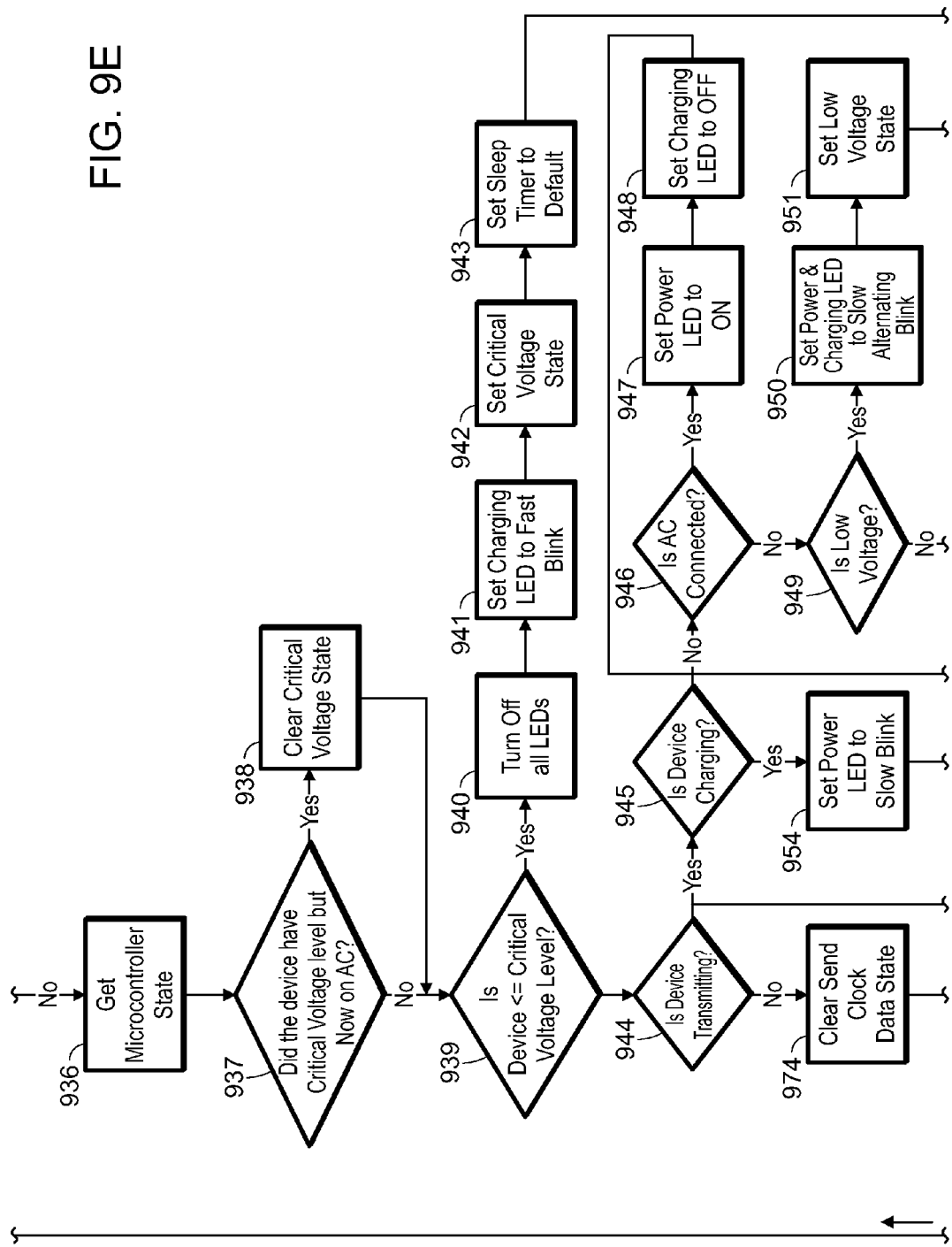

With reference now to FIG. 9D, if a reset code was reported 927 other than normal power-up, the reset code is sent with a message to the gateway 928 stating the RESET code and the reason for the reset, if there is one that can be determined. The RESET message and code are then reset 929. Thereafter, or if a reset code has not been recorded, startup sequence tones are sent to the clock 930. This is an audible indication to the user that the device is up and running. For power saving purposes, the scrolling of the LEDs is stopped 931. To signify the end of the startup sequence, all of the LEDs are turned on and off in sequence three times 932.

With reference to FIGS. 9D-9H, after the end of the startup sequence, the main program loop begins. This is a tight loop that is part of the power conservation. The loop checks to determine if the program should be shut down 933. If so, the LEDs are turned off 934, and the Set Alert LED is set to a fast blink 935, which indicates that the embedded code is no longer running.

If the system is not to be shut down, the system gets the microcontroller state 936. As a power saving measure, the system reduces the amount of serial communication that occurs with the microcontroller. The system then determines if the device has a critical voltage level, but is now on AC power 937. If so, the critical voltage state is cleared 938. However, if not, the system determines if the device is at or below the critical voltage level 939. If the device is at the critically low voltage level, the LEDs are turned off 940 and the Charging LED is set to fast blink 941 as an indication that the device is at a critical battery voltage and will no longer transmit data. The critical voltage state is set 942 and the sleep timer is set to default 943. This tells the microcontroller how long to leave the cellular modem in sleep mode.

The system then determines if the device is transmitting 944, that is transmitting worker time and attendance records. If so, the system determines whether the device is charging 945. This indicates if the charging circuit is active. This can be a No, and the AC can still be connected, which would just mean that the battery is fully charged. The system determines whether the AC is connected 946. If the AC is connected, the power LED is set to on 947, which indicates to the user that the device is plugged in. If the AC power cord is connected, the Charging LED is set to off 948. It is set to off as the charging circuit will turn it to ON or OFF automatically based on if it is charging or not.

However, if the AC power cord is not connected to the device, the system determines whether there is low voltage power from the battery 949. If so, the Power and Charging LED is set to a slow alternating blink 950, to indicate to the user that the device is at a low battery level. The device is then set to a low voltage state 951.

Referring back to step 949, if the AC is not connected and the battery is not low, the Power LED will be set to a slow blink 952, indicating that the device is powered on and functioning normally. The Charging LED is set to off 953.

Referring back to step 945, if the device is charging, the Power LED is set to a slow blink 954. The Charging LED is set to off 955. The low voltage state is cleared 956.

Figure 9F:
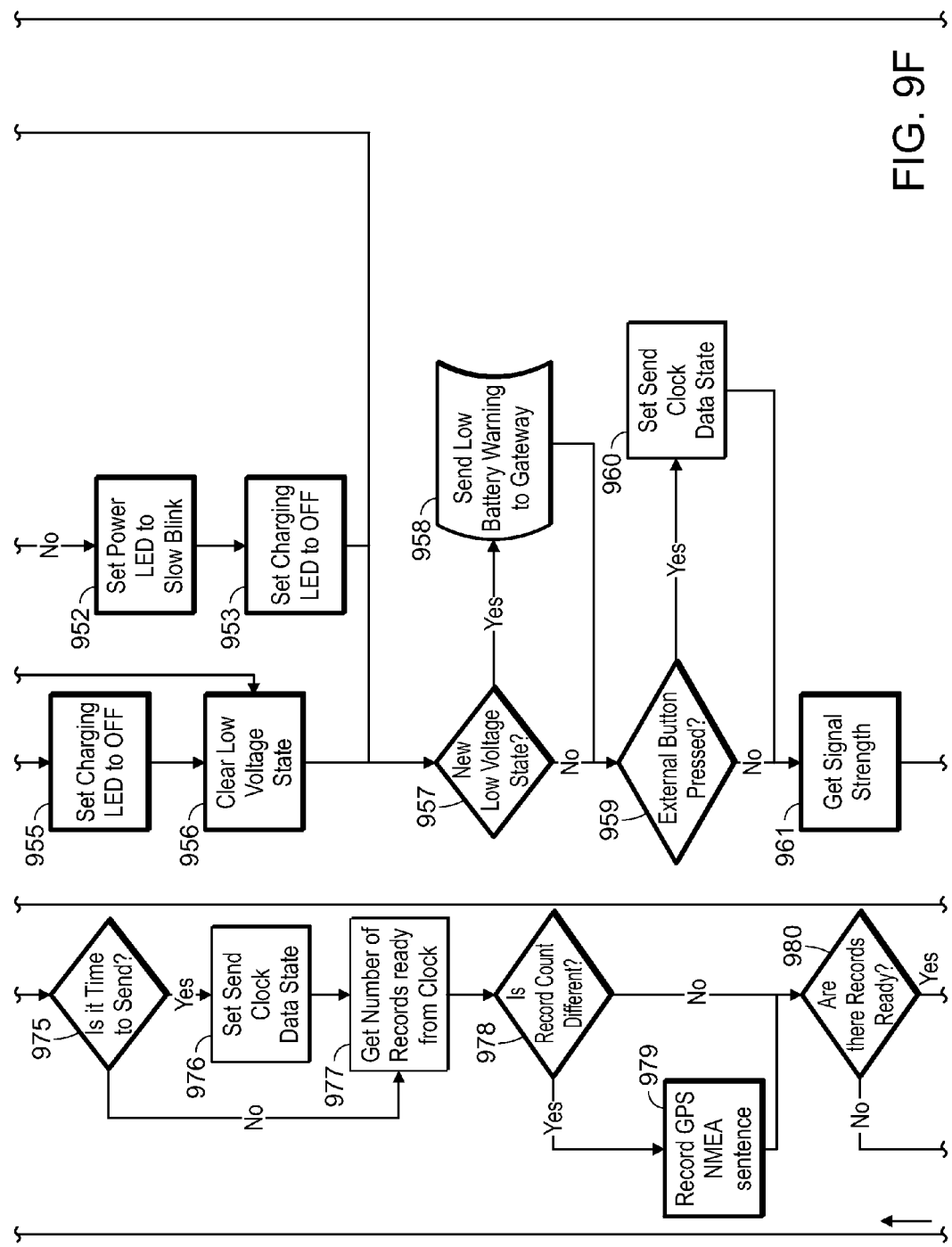

Referring now to FIG. 9F, the device determines if this is a new low voltage state 957, in other words is the low power state set and is it the first time that the device is in that state since charging. If so, a low battery warning is sent to the gateway service 958. If not, it is determined whether an external button has been pressed 959. For example, the manager button may have been pressed which indicates that the device is to transmit any time and attendance events currently on the device. If an external button, such as the manager button, has been pressed, the device sets the send clock data state 960. The signal strength from the cellular modem is obtained 961.

With reference to FIG. 9G, the device determines if there is a sufficient signal to transmit 962. If so, the Signal LED is set to slow blink 963. The Signal LED is set to slow blink in order to conserve power. However, the device needs to notify the user that there is enough signal so that the time and attendance events can be transmitted. If there is insufficient signal, the Signal LED is set to OFF 964.

SMS commands received from the gateway service 300 are processed 965. To save power, the device only processes the SMS commands when the cellular modem is brought out of sleep mode by the microcontroller. Typically, they are not processed as soon as they are received in order to conserve power. The device then checks to see if the current month has changed 966. If the current month has changed, the device will update its daylight saving time values 967, and set the daylight saving time settings on the clock 968. This date is only obtained once a month while it is running to reduce power consumption. This can be the case as the data does not change very often. The default setting is to once a month and this is to primarily take into account that the user decides to turn on or off the daylight saving time feature.

The device determines if the battery voltage is super critical 969, to the point where the cellular modem won't operate. If so, the cellular chip and modem is shut down 970.

Figure 9H:
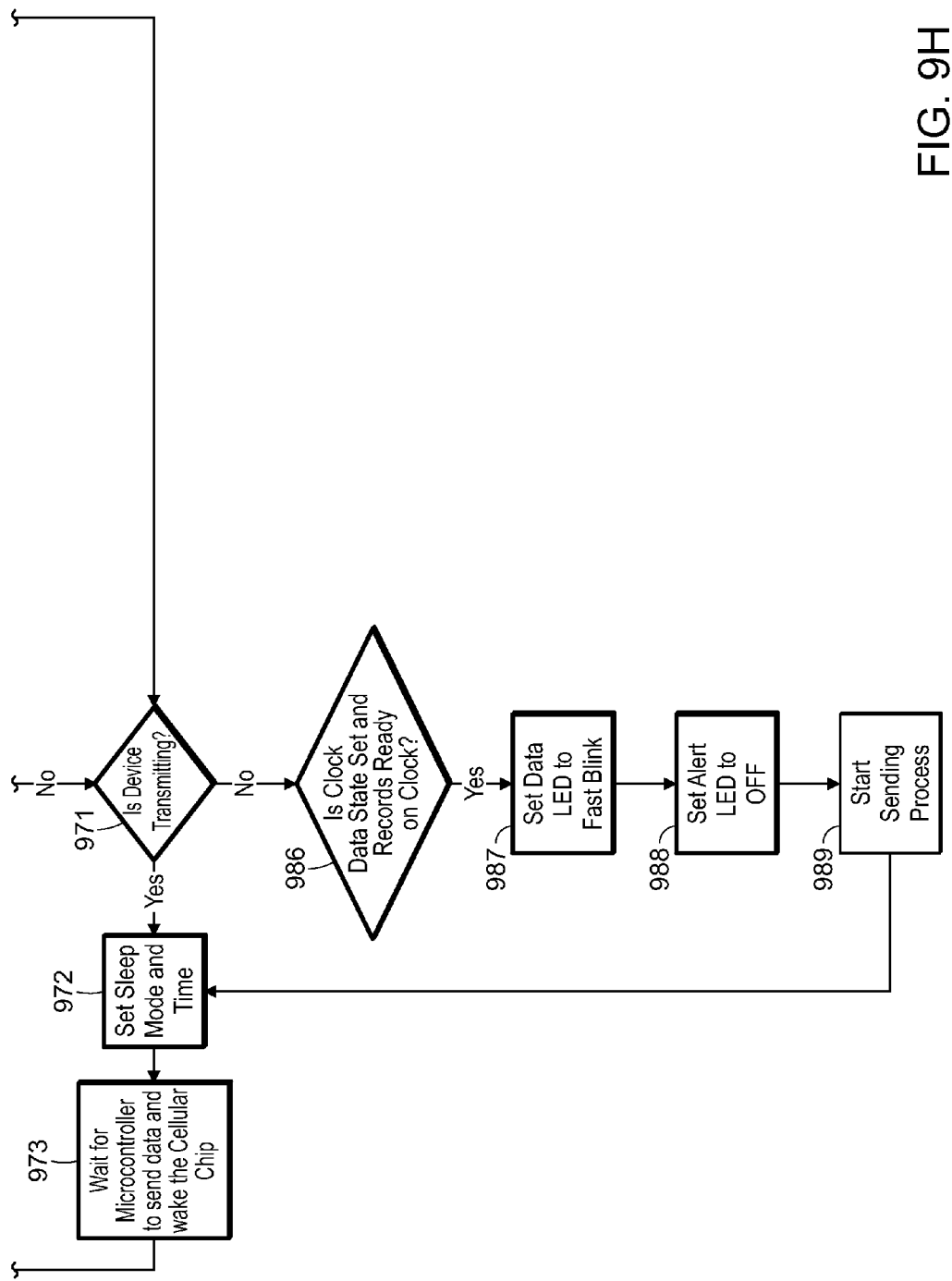

With reference to FIG. 9H, the device determines whether it is transmitting 971. If so, the microcontroller is signaled that the loop is complete and the cellular modem is ready to sleep. The sleep mode and time are set 972. Typically, an amount of time in which the embedded code should be idled for is relayed. The default is sixty seconds. This conserves a tremendous amount of power for the device as the cellular modem and embedded code is running for a minimal amount of time every sixty seconds, meaning that the cellular modem is in a low power mode most of the time. The embedded code is blocked on the serial port waiting for the microcontroller to send it data and in turn, this allows the cellular modem to go into a low power mode. When the microcontroller sends data of the serial connection, the cellular modem will wake up and the embedded code will resume 973. Referring back to step 944 of FIG. 9E, if the device is not transmitting, the send clock data state is cleared 974. The device checks to see if it is time to send 975. By default, the device will send data if there is any once every hour. If there is a failure to send then it will try once every five minutes for fifty minutes. This is part of the power management saving methods of the present invention. It will be appreciated that the pre-established schedule can be changed for when the device will send. For example, Monday through Friday at nine a.m. and six p.m., instead of every hour. Alternatively, once every week or two, such as at Friday at seven p.m. The send clock data state is then set 976 and the number of records consisting of worker time and attendance data which are ready from the clock are obtained 977.

The device determines if the record count is different 978, in other words, are there any new worker time and attendance data records. If so, the device may record GPS NMEA sentence or string with the records 979. The record count on the clock is checked to see if it is different since the last time the loop ran. This is done so that the device only collects GPS NMEA sentences when there have been new worker time and attendance events recorded by the clock. This allows the device to not store more GPS data than is needed or relevant. In turn, this reduces how much the device needs to transmit to the server 300 and in turn reduces power consumption during transmission. If there are new records, the GPS NMEA sentence is obtained from the microcontroller and stored for transmission.

The device then determines if there are any new worker time and attendance event records which are ready 980. If not, the Data LED is set to off 981. However, if there are new records, or the records are ready, the Data LED is set to a slow blink 982. The device then determines if the transmission was successful 983. If not, then the Alert LED is set to a slow blink 984, to provide a visual indication to the user that there was a transmission problem. The device will then run through the routine described above to determine if there is AC power, sufficient battery power and a sufficient signal. However, if the send was successful, the Alert LED is set to off 985.

With reference again to step 971 of FIG. 9H, if the device is not transmitting, the device queries as to whether the clock data state is set and the records are ready on the clock 986. If so, the Data LED is set to a fast blink 987, as a visual indicator to the user that the device is transmitting the worker time and attendance data records. The Alert LED is then set to off 988. The sending process is started 989, before setting the modem in a sleep mode 972.

Figure 10:
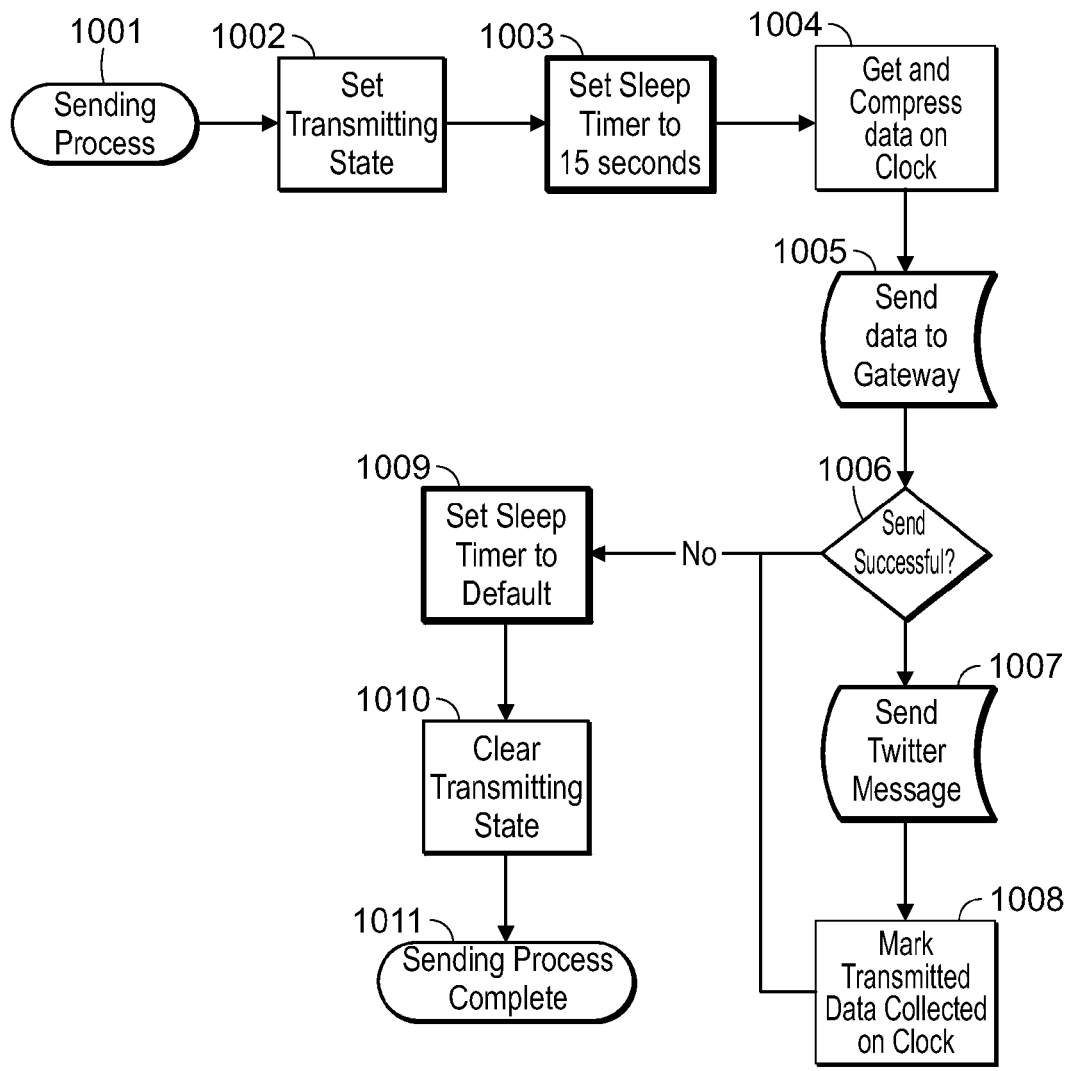
FIG. 10 is a flow chart depicting the steps taken during transmission, in accordance with the present invention.

With reference now to FIG. 10, the start sending employee time and attendance data records is usually begun in a separate thread or process, which keeps the user interface responsive to changes in signal and power. The sending process 1001 is begun by setting the transmission state 1002. The sleep timer is set to a predetermined period of time, such as fifteen seconds 1003, to make the user interface more responsive to changes in the signal strength when it is finished transmitting. The device gets and compresses the data from the clock 1004. The amount of data that is sent is kept to a minimum in order to conserve and save as much power as possible. This reduces how long the radio must be active and transmitting. The worker time and attendance data is then sent to the gateway 1005. The device determines if the send was successful 1006. IF so, a Twitter™ message, in the form of a Tweet™ is sent with the clock serial number and how many records were transmitted. The user or the owner of the device 200 can thus receive periodic confirmation that the device 200 is in operation, even if the owner of the device is not at the jobsite and physically in front of the device 200 so as to read the LED notifications. Such a short text message in the form of a Twitter™ Tweet™ can also be useful for the gateway service provider. The device then marks the data collected on the clock as transmitted 1008. Typically, the GPS NMEA sentences that have been transmitted are cleared. This is only done once the data has been confirmed that it has been sent to the remote computer server at the gateway 300. Once this is done, or if the send was not successful, the sleep timer is then set to the default 1009. The transmitting state is cleared 1010 and the sending process is complete and terminates 1011.

As the system leaves its sleep mode periodically, according to the pre-established scheduled, it queries whether it is time to send and transmit new data, according to step 975, and proceeds through steps 975-985 in order to determine if there are new time and attendance data records and to transmit such records.

Figure 11:
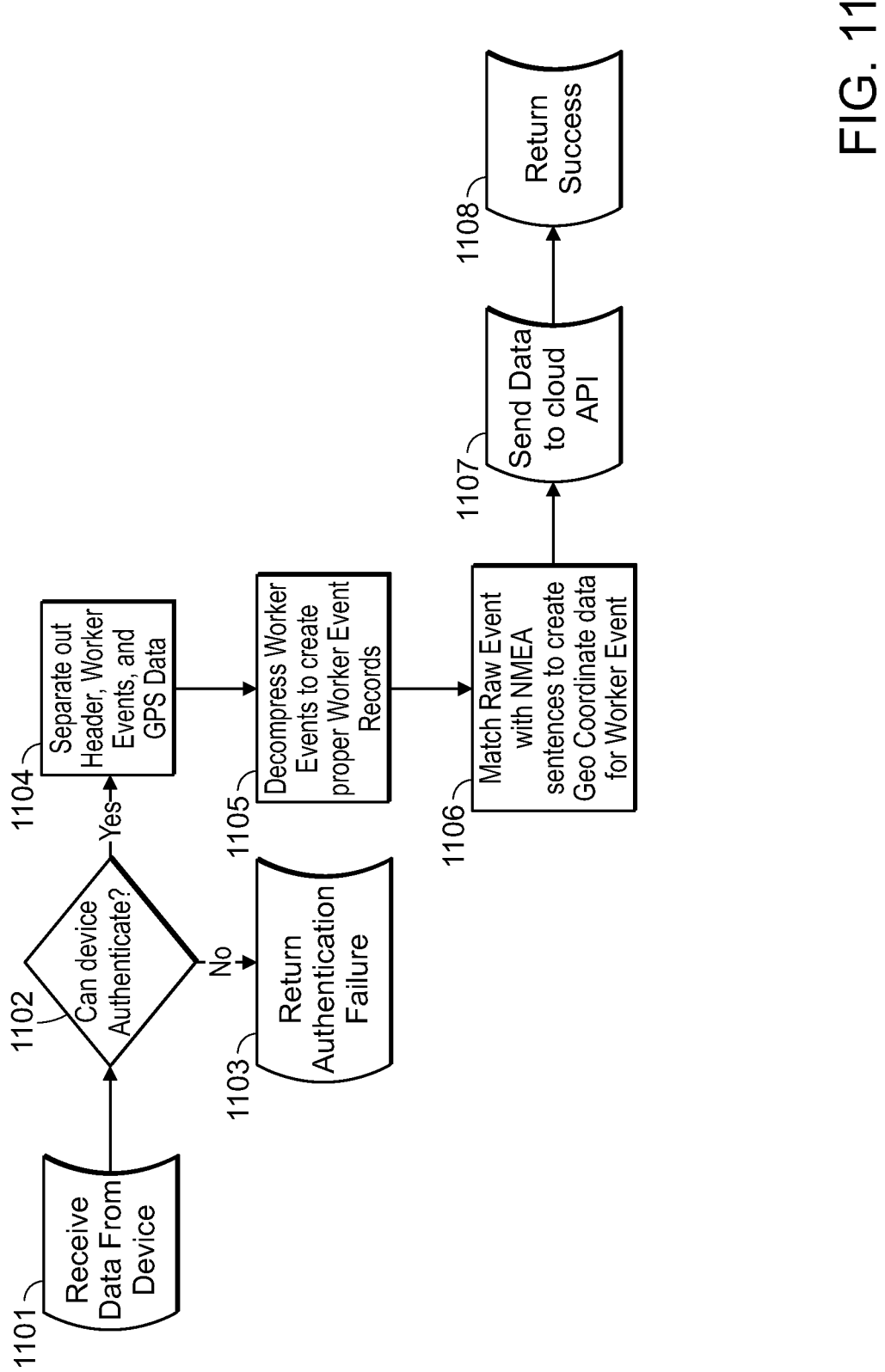
FIG. 11 is a flow chart depicting the steps taken in accordance with receiving the transmitted data at a remote computer, in accordance with the present invention.

With reference now to FIG. 11, at the remote computer/server gateway service side, the remote computer server receives the data from the device 1101. It is determined whether the device can be authenticated 1102, by checking the authentication of the device and validating it within the system. If not, an authentication failure is returned. However, if the device is authenticated, the system separates out the metadata in the header, worker time and attendance data events, and GPS data 1104. The metadata within the header can include status information of the device, such as to whether the device is currently being powered by AC power, the voltage of the battery, etc. This information is used at the remote computer gateway service center to determine the functionality of the device 200, and whether software or firmware updates are needed, the owner and user of the device needs to be notified that the battery needs to be replaced or recharged or AC power supplied thereto, etc. Typically, this data is not forwarded on to the end user's computer, but rather only the worker time and attendance data events and the GPS data.

The worker time and attendance data events are decompressed to create proper worker event records 1105. For each raw event, it is matched up to the closest NMEA sentence so that it contains the proper geo coordinate for that worker's time and attendance event data 1106. The compiled data is then sent to the cloud API (Application Programming Interface) 1107. This will allow the data to be viewed and processed by the end user customer 400. A return confirmation is then provided that this procedure has been successfully processed and the records stored and all of the geo coordinates and worker time and attendance data stored 1108.

It will be appreciated by those skilled in the art that the device 200 and system 100 of the present invention enables time and attendance data to be delivered to the collection point or user's main office automatically. It enables the user to be able to track worker time and attendance data and events at any location and get that data according to a pre-established schedule, which can be near-real-time. This enables the employer, without ever leaving his or her office, to obtain one hundred percent accurate payroll records periodically, such as every hour. Verification and preparation of payroll can be made throughout the week, instead of rushing at the end of the pay period. The system of the present invention enables the employer to know who is at what worksite at any given time. This enables the employer, for example, to know if a worker is about to reach overtime hours.

Although several embodiments have been described in detail for purposes of illustration, various modifications may be made without departing from the scope and spirit of the invention. Accordingly, the invention is not to be limited, except as by the appended claims.

What is claimed is:

1. A system for tracking and communicating time attendance data for workers at a remote worksite, the system comprising:
    a remote computer; and
    a portable time and attendance device configured to receive and store worker time attendance data and transmit the data to the remote computer via a wireless network;
    wherein the portable time and attendance device comprises:
    a portable housing;
    a power module comprising a primary battery disposed within the housing;
    a main unit at least partially disposed within the housing and operably coupled to the primary battery comprising an electronic controller, an electronic memory and a communications module for transmitting and receiving data via the wireless network;
    an electronic time clock at least partially disposed within the housing and operably coupled to the primary battery and in electronic communication with the main unit and comprising a user interface for entering worker time attendance data, an internal clock, a memory for storing the entered worker time attendance data; and
    a second battery disposed within the housing for powering only the electronic time clock to receive and store worker time attendance data when the electronic time clock does not receive power or the primary battery has a charge below a predetermined threshold;
    wherein the main unit is configured to periodically request recorded time and attendance data from the time and attendance clock according to a preset schedule, and forward the recorded time and attendance data to the remote computer via the wireless network only if there is new time and attendance data since a prior transmission to conserve primary battery power.

2. The system of claim 1, wherein the communications module is configured to receive and transmit data via a wireless cellular communications network.

3. The system of claim 2, wherein the remote computer comprises a gateway cloud server that receives the data from the wireless cellular communications network.

4. The system of claim 1, wherein the portable time and attendance device includes a status notification interface comprising a plurality of LEDs which are illuminated in combination and/or flash to alert a user of the status of the device.

5. The system of claim 1, wherein the power module of the portable time and attendance device comprises an adapter for receiving alternating current power.

6. The system of claim 1, wherein the time and attendance device includes a GPS module for determining the location of the time and attendance device.

7. A method for tracking and communicating worker time and attendance data associated with workers assigned to a remote worksite, comprising the steps of:
    providing a portable time and attendance tracking device at the remote worksite comprising a portable housing, a primary battery disposed within the housing, a second battery disposed within the housing, a main unit at least partially disposed within the housing, an electronic controller, an electronic memory, and a communications module for transmitting and receiving data via a wireless communications network, and an electronic time clock at least partially disposed within the housing and in electronic communication with the main unit comprising a user interface for entering worker time attendance data, an internal clock, and an electronic controller;
    receiving on the electronic time clock time and attendance data for a worker;
    storing the time and attendance data for the worker on the electronic memory of the electronic time and attendance clock;
    the main unit periodically querying the electronic time and attendance clock according to a pre-established schedule to determine if new worker time and attendance data has been stored on the electronic memory of the electronic time and attendance clock;
    only if there is worker time and attendance data since a prior transmission, transmitting the new worker time and attendance data to a remote computer via a wireless network according to the pre-established schedule in order to conserve primary battery power; and
    using power from the second battery to only power the electronic time clock to receive and store worker time and attendance data when sufficient power is not available from the primary battery.

8. The method of claim 7, including the step of associating a worker identity and a time that the worker clocked in or clocked out with the time and attendance data stored on the time and attendance clock electronic memory.

9. The method of claim 7, including the step of at least the communications module of the main unit entering a sleep mode between scheduled query and transmission times.

10. The method of claim 7, including the step of retrieving new worker time and attendance data from the electronic memory of the time and attendance clock and storing the new worker time and attendance data on the main unit prior to transmitting the new worker time and attendance data to the remote computer.

11. The method of claim 7, including the step of transmitting device GPS data with the time and attendance data.

12. The method of claim 7, including the step of conveying device status notifications via a predetermined pattern of illumination of a plurality of LEDs.

13. The method of claim 7, including the step of transmitting a text message when time and attendance data is transmitted to the remote computer.

14. The method of claim 13, wherein the text message comprises a Twitter notification Tweet.

15. The method of claim 7, including the step of transmitting status data of the time and attendance device when transmitting time and attendance data, including device power data.

16. The method of claim 7, wherein the receiving and storing the time and attendance data of a worker on the electronic time and attendance clock and the transmitting of time and attendance data from the main unit occur asynchronously.

17. The method of claim 7, including the step of sending from a remote computer text messages to the portable time and attendance device to provide device updates or device status queries.

18. The method of claim 7, wherein the remote computer comprises a gateway cloud server that receives the data from the wireless cellular communications network.

* * * * *